US 11,763,495 B2

United States Patent
Ojha et al.

(10) Patent No.: US 11,763,495 B2
(45) Date of Patent: Sep. 19, 2023

(54) FEW-SHOT DIGITAL IMAGE GENERATION USING GAN-TO-GAN TRANSLATION

(71) Applicant: Adobe Inc., San Jose, CA (US)

(72) Inventors: Utkarsh Ojha, Davis, CA (US); Yijun Li, Seattle, WA (US); Richard Zhang, San Francisco, CA (US); Jingwan Lu, Santa Clara, CA (US); Elya Shechtman, Seattle, WA (US); Alexei A. Efros, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 252 days.

(21) Appl. No.: 17/163,284

(22) Filed: Jan. 29, 2021

(65) Prior Publication Data
US 2022/0254071 A1 Aug. 11, 2022

(51) Int. Cl.
*G06T 11/00* (2006.01)
*G06N 3/02* (2006.01)
*G06F 18/22* (2023.01)
*G06F 18/214* (2023.01)

(52) U.S. Cl.
CPC .......... *G06T 11/00* (2013.01); *G06F 18/214* (2023.01); *G06F 18/22* (2023.01); *G06N 3/02* (2013.01)

(58) Field of Classification Search
None
See application file for complete search history.

(56) References Cited

U.S. PATENT DOCUMENTS

| | | | |
|---|---|---|---|
| 10,176,405 B1* | 1/2019 | Zhou | G06T 7/246 |
| 2018/0314716 A1* | 11/2018 | Kim | G06T 1/20 |
| 2019/0295302 A1* | 9/2019 | Fu | G06V 10/82 |
| 2019/0332850 A1* | 10/2019 | Sharma | G06T 5/20 |
| 2020/0285888 A1* | 9/2020 | Borar | G06V 10/454 |
| 2021/0097888 A1* | 4/2021 | Port | G09B 21/006 |
| 2021/0397889 A1* | 12/2021 | Gong | G06V 30/194 |

OTHER PUBLICATIONS

Asghar et al., "Edge-Texture Feature-Based Image Forgery Detection with Cross-Dataset Evaluation" (Year: 2019).*
Gan et al., "Triangle Generative Adversarial Networks" (Year: 2017).*

(Continued)

*Primary Examiner* — Hilina K Demeter
(74) *Attorney, Agent, or Firm* — Keller Preece PLLC

(57) ABSTRACT

The present disclosure relates to systems, methods, and non-transitory computer readable media for accurately and efficiently modifying a generative adversarial neural network using few-shot adaptation to generate digital images corresponding to a target domain while maintaining diversity of a source domain and realism of the target domain. In particular, the disclosed systems utilize a generative adversarial neural network with parameters learned from a large source domain. The disclosed systems preserve relative similarities and differences between digital images in the source domain using a cross-domain distance consistency loss. In addition, the disclosed systems utilize an anchor-based strategy to encourage different levels or measures of realism over digital images generated from latent vectors in different regions of a latent space.

20 Claims, 13 Drawing Sheets

(56) References Cited

OTHER PUBLICATIONS

Mahapatra et al., "Image Super-Resolution using Progressive Generative Adversarial Networks for Medical Image Analysis" (Year: 2019).*

Rameen Abdal, Yipeng Qin, and Peter Wonka. Image2stylegan: How to embed images into the stylegan latent space? In Int. Conf. Comput. Vis., 2019.

Sagie Benaim and Lior Wolf. One-sided unsupervised domain mapping. In Adv. Neural Inform. Process. Syst., 2017.

Andrew Brock, Jeff Donahue, and Karen Simonyan. Large scale gan training for high fidelity natural image synthesis. arXiv preprint arXiv:1809.11096, 2018.

Ting Chen, Simon Kornblith, Mohammad Norouzi, and Geoffrey Hinton. A simple framework for contrastive learning of visual representations. arXiv preprint arXiv:2002.05709, 2020.

Alexey Dosovitskiy and Thomas Brox. Inverting visual representations with convolutional networks. In Proceedings of the IEEE conference on computer vision and pattern recog- nition, pp. 4829-4837, 2016.

Chelsea Finn, Pieter Abbeel, and Sergey Levine. Model-agnostic meta-learning for fast adaptation of deep networks. In ICML, 2017.

Kaiming He, Haoqi Fan, Yuxin Wu, Saining Xie, and Ross Girshick. Momentum contrast for unsupervised visual representation learning. In Proceedings of the IEEE/CVF Conference on Computer Vision and Pattern Recognition, pp. 9729-9738, 2020.

Martin Heusel, Hubert Ramsauer, Thomas Unterthiner, Bernhard Nessler, and Sepp Hochreiter. Gans trained by a two time-scale update rule converge to a local nash equilibrium. In Adv. Neural Inform. Process. Syst., 2017.

Phillip Isola, Jun-Yan Zhu, Tinghui Zhou, and Alexei A Efros. Image-to-image translation with conditional adversarial networks. In IEEE Conf. Comput. Vis. Pattern Recog., 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Miika Aittala, Janne Hellsten, Samuli Laine, Jaakko Lehtinen, and Timo Aila. Training generative adversarial networks with limited data. In Adv. Neural Inform. Process. Syst., 2020.

Tero Karras, Samuli Laine, and Timo Aila. A style-based generator architecture for generative adversarial networks. In IEEE Conf. Comput. Vis. Pattern Recog., 2019.

Tero Karras, Samuli Laine, Miika Aittala, Janne Hellsten, Jaakko Lehtinen, and Timo Aila. Analyzing and improving the image quality of stylegan. arXiv preprint arXiv:1912.04958, 2019.

James Kirkpatrick, Razvan Pascanu, Neil Rabinowitz, Joel Veness, Guillaume Desjardins, Andrei A Rusu, Kieran Milan, John Quan, Tiago Ramalho, Agnieszka Grabska-Barwinska, et al. Overcoming catastrophic forgetting in neural networks. Proceedings of the national academy of sciences, 114(13):3521-3526, 2017.

Brenden M Lake, Ruslan Salakhutdinov, and Joshua B Tenenbaum. Human-level concept learning through probabilistic program induction. Science, 350(6266):1332-1338, 2015.

Yijun Li, Richard Zhang, Jingwan Lu, and Eli Shechtman. Few-shot image generation with elastic weight consolidation. InAdvances in Neural Information Processing Systems, 2020.

Ming-Yu Liu, Xun Huang, Arun Mallya, Tero Karras, Timo Aila, Jaakko Lehtinen, and Jan Kautz. Few-shot unsupervised image-to-image translation. In Int. Conf. Comput. Vis., 2019.

Shaohui Liu, Xiao Zhang, Jianqiao Wangni, and Jianbo Shi. Normalized diversification. In IEEE Conf. Comput. Vis. Pattern Recog., 2019.

Qi Mao, Hsin-Ying Lee, Hung-Yu Tseng, Siwei Ma, and Ming-Hsuan Yang. Mode seeking generative adversarial networks for diverse image synthesis. In IEEE Conf. Comput. Vis. Pattern Recog., 2019.

Sangwoo Mo, Minsu Cho, and Jinwoo Shin. Freeze discriminator: A simple baseline for fine-tuning gans.arXiv preprint arXiv:2002.10964, 2020.

Alex Nichol, Joshua Achiam, and John Schulman. On first-order meta-learning algorithms.arXiv preprint arXiv:1803.02999, 2018.

Atsuhiro Noguchi and Tatsuya Harada. Image generation from small datasets via batch statistics adaptation. In Int. Conf. Comput. Vis., 2019.

Aaron van den Oord, Yazhe Li, and Oriol Vinyals. Representation learning with contrastive predictive coding.arXiv preprint arXiv:1807.03748, 2018.

Kuniaki Saito, Kate Saenko, and Ming-Yu Liu. Coco-funit: Few-shot unsupervised image translation with a content conditioned style encoder.arXiv preprint arXiv:2007.07431, 2020.

Jake Snell, Kevin Swersky, and Richard Zemel. Prototypical networks for few-shot learning. InAdv. Neural Inform. Process. Syst., 2017.

Ngoc-Trung Tran, Tuan-Anh Bui, and Ngai-Man Cheung. Dist-gan: An improved gan using distance constraints. In Proceedings of the European Conference on Computer Vision (ECCV), 2018.

Dmitry Ulyanov, Vadim Lebedev, Andrea Vedaldi, and Victor S Lempitsky. Texture networks Feed-forward synthesis of textures and stylized images. InICML, vol. 1, p. 4, 2016.

Arash Vahdat and Jan Kautz. Nvae: A deep hierarchical variational autoencoder. In Neural Information ProcessingSystems (NeurIPS), 2020.

Oriol Vinyals, Charles Blundell, Timothy Lillicrap, Daan Wierstra, et al. Matching networks for one shot learning. In Adv. Neural Inform. Process. Syst., 2016.

Xiaogang Wang and Xiaoou Tang. Face photo-sketch synthesis and recognition. IEEE Trans. Pattern Anal. Mach. Intell., 31(11):1055-1967, 2009.

Yaxing Wang, Abel Gonzalez-Garcia, David Berga, Luis Herranz, Fahad Shahbaz Khan, and Joost van de Weijer. Minegan: effective knowledge transfer from gans to target domains with few images. In IEEE Conf. Comput. Vis. Pattern Recog., 2020.

Yaxing Wang, Salman Khan, Abel Gonzalez-Garcia, Joost van de Weijer, and Fahad Shahbaz Khan. Semi-supervised learning for few-shot image-to-image translation. In IEEE Conf. Comput. Vis. Pattern Recog., 2020.

Yaxing Wang, Chenshen Wu, Luis Herranz, Joost van de Weijer, Abel Gonzalez-Garcia, and Bogdan Raducanu. Transferring gans: generating images from limited data. In Eur. Conf. Comput. Vis., 2018.

Dingdong Yang, Seunghoon Hong, Yunseok Jang, Tianchen Zhao, and Honglak Lee. Diversity-sensitive conditional generative adversarial networks. arXiv preprint arXiv:1901.09024, 2019.

Jordan Yaniv, Yael Newman, and Ariel Shamir. The face of art: landmark detection and geometric style in portraits. ACM Transactions on Graphics (TOG), 38(4):1-15, 2019.

Fisher Yu, Yinda Zhang, Shuran Song, Ari Seff, and Jianxiong Xiao. Lsun: Construction of a large-scale image dataset using deep learning with humans in the loop. arXiv preprint arXiv:1506.03365, 2015.

Shengyu Zhao, Zhijian Liu, Ji Lin, Jun-Yan Zhu, and Song Han. Differentiable augmentation for data-efficient gan training. arXiv preprint arXiv:2006.10738, 2020.

Jun-Yan Zhu, Taesung Park, Phillip Isola, and Alexei A Efros. Unpaired image-to-image translation using cycle-consistent adversarial networks. In Int. Conf. Comput. Vis., 2017.

Jun-Yan Zhu, Richard Zhang, Deepak Pathak, Trevor Darrell, Alexei A Efros, Oliver Wang, and Eli Shechtman. Toward multimodal image-to-image translation. In Adv. Neural Inform. Process. Syst., 2017.

L. A. Gatys, A. S. Ecker, and M. Bethge. Image style transfer using convolutional neural networks. In CVPR, 2016.

I. Goodfellow, J. Pouget-Abadie, M. Mirza, B. Xu, D. Warde-Farley, S. Ozair, A. Courville, and Y. Bengio. Generative adversarial nets. In NIPS, 2014.

* cited by examiner

|  | Caricatures | Amedeo's paintings | Sketches |
|---|---|---|---|
| TGAN | 0.39 ± 0.06 | 0.41 ± 0.03 | 0.39 ± 0.03 |
| TGAN + ADA | 0.50 ± 0.05 | 0.51 ± 0.04 | 0.41 ± 0.05 |
| BSA | 0.35 ± 0.01 | 0.39 ± 0.04 | 0.35 ± 0.01 |
| FreezeD | 0.37 ± 0.01 | 0.40 ± 0.03 | 0.39 ± 0.03 |
| MineGAN | 0.39 ± 0.07 | 0.42 ± 0.03 | 0.40 ± 0.05 |
| EWC | 0.47 ± 0.03 | 0.52 ± 0.03 | 0.42 ± 0.03 |
| GAN Translation System | 0.53 ± 0.01 | 0.60 ± 0.01 | 0.45 ± 0.02 |

*Fig. 7*

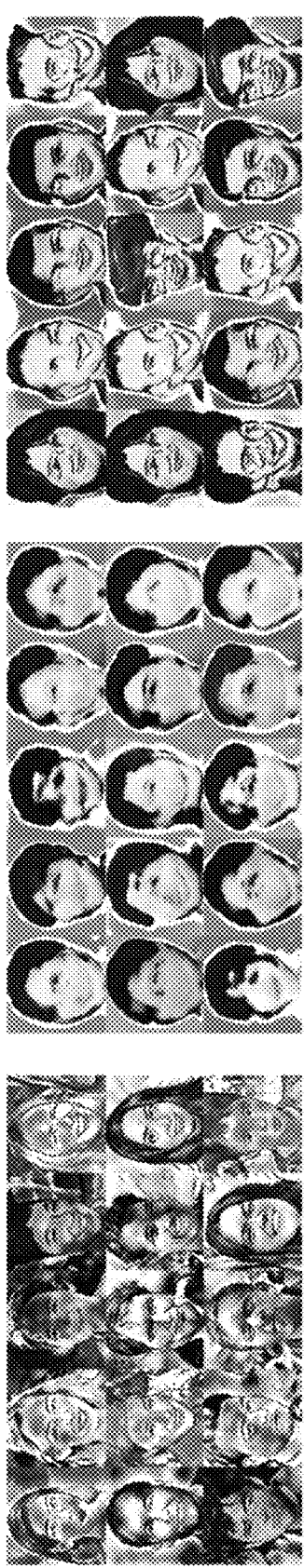
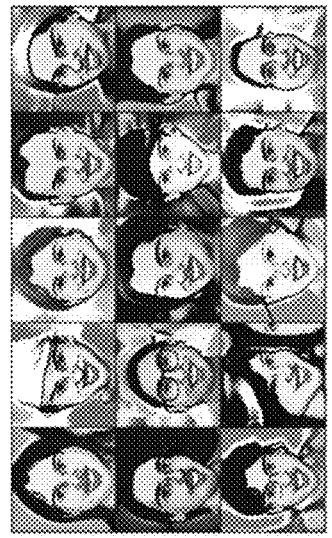
Fig. 8

```
┌─────────────────────────────────────────────────────────────────┐
│   Generating A Set Of Digital Images Belonging To A Source Domain 1002 │
└─────────────────────────────────────────────────────────────────┘
                                  │
                                  ▼
┌─────────────────────────────────────────────────────────────────┐
│   Determining Relative Pairwise Distances Among Pairs Of Digital Images │
│                              1004                                │
└─────────────────────────────────────────────────────────────────┘
                                  │
                                  ▼
┌─────────────────────────────────────────────────────────────────┐
│  Learning Parameters For A Generative Adversarial Neural Network While │
│        Preserving The Relative Pairwise Distances 1006           │
└─────────────────────────────────────────────────────────────────┘
```

```
┌─────────────────────────────────────────────────────────────────┐
│ Generating A First Set Of Digital Images From A First Set Of    │
│ Latent Vectors Sampled From A First Region Of A Latent Space    │
│ 1008                                                            │
└─────────────────────────────────────────────────────────────────┘
                              │
                              ▼
┌─────────────────────────────────────────────────────────────────┐
│ Generating A Second Set Of Digital Images From A Second Set Of  │
│ Latent Vectors Sampled From A Second Region Of The Latent Space │
│ 1010                                                            │
└─────────────────────────────────────────────────────────────────┘
                              │
                              ▼
┌─────────────────────────────────────────────────────────────────┐
│ Updating Parameters Of A Target GAN By:                         │
│ Enforcing, For The First Set Of Digital Images, A First Measure │
│ Of Realism                                                      │
│ And                                                             │
│ Enforcing, For The Second Set Of Digital Images, A Second       │
│ Measure Of Realism 1012                                         │
└─────────────────────────────────────────────────────────────────┘
```

*Fig. 10B*

FEW-SHOT DIGITAL IMAGE GENERATION USING GAN-TO-GAN TRANSLATION

BACKGROUND

Recent years have seen significant developments in software and hardware platforms for generating digital images using generative models such as generative adversarial networks ("GANs"). Despite these advances, however, many conventional digital image generation systems suffer from a number of deficiencies or disadvantages, particularly in accuracy and efficiency. For example, conventional systems that implement generative models on a target domain containing limited training examples often result in overfitting. Indeed, when conventional systems learn parameters for generative models using a limited example set, these systems conventional systems often overfit the parameters and end up generating only digital images resembling the limited training example set. As a result of this overfitting problem, conventional systems often lose diversity in the pool of generated digital images, resulting in inaccurate digital images that retain little to no diversity.

Due at least in part to their inaccuracy, many conventional digital image generation systems also suffer from inefficiency. In particular, some conventional systems inefficiently utilize computing resources such as processing time, processing power, and memory in generating diverse sets of digital images. For example, to generate diverse sets of digital images, conventional systems often require large sets of input data for expensive training and retraining of generative models for each different distribution or domain. This computationally intensive retraining requires large amounts of computing resources.

Thus, there are several disadvantages with regard to conventional digital image generation systems.

SUMMARY

One or more embodiments described herein provide benefits and solve one or more of the foregoing or other problems in the art with systems, methods, and non-transitory computer readable media that accurately and efficiently generate digital images while maintaining diversity and realism. In particular, the disclosed systems utilize GAN-to-GAN translation to modify a generative adversarial neural network using few-shot adaptation to allow the modified GAN to generate diverse and realistic digital images from a domain with limited examples. For example, the disclosed systems then GAN-to-GAN translation that preserves diversity information from a source generative adversarial neural network trained on a large source domain to learn parameters for a target generative adversarial neural network that generates images corresponding to a target domain having a limited number of learning examples. To reduce overfitting when adapting the target generative adversarial neural network, the disclosed systems preserve relative similarities and differences between digital images in the source domain by ensuring cross-domain distance consistency between feature vectors generated by the source and target adversarial neural networks from the same latent vectors. To further reduce overfitting while ensuring realism, the disclosed systems utilize an anchor-based strategy to encourage different levels or measures of realism over different regions in a latent space. By utilizing these techniques, the disclosed systems reduce overfitting in the target generative adversarial neural network and allow the target generative adversarial neural network to generate diverse and realistic digital images true to the target domain. Further, the GAN-to-GAN translation of the disclosed systems is an efficient process that requires relatively little input data to learn parameters for the target generative adversarial neural network.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 7 illustrates a table of performance metrics comparing the GAN translation system with other systems in accordance with one or more implementations;

FIG. 8 illustrates example digital images generated by a target generative adversarial neural network compared to digital images generated by other systems in accordance with one or more implementations;

FIGS. 10A-10B illustrate flowcharts of a series of acts for modifying a source generative adversarial neural network using few-shot adaptation to generate a target source generative adversarial neural network that generates digital images while maintaining diversity and realism in accordance with one or more implementations.

DETAILED DESCRIPTION

Figure 1:
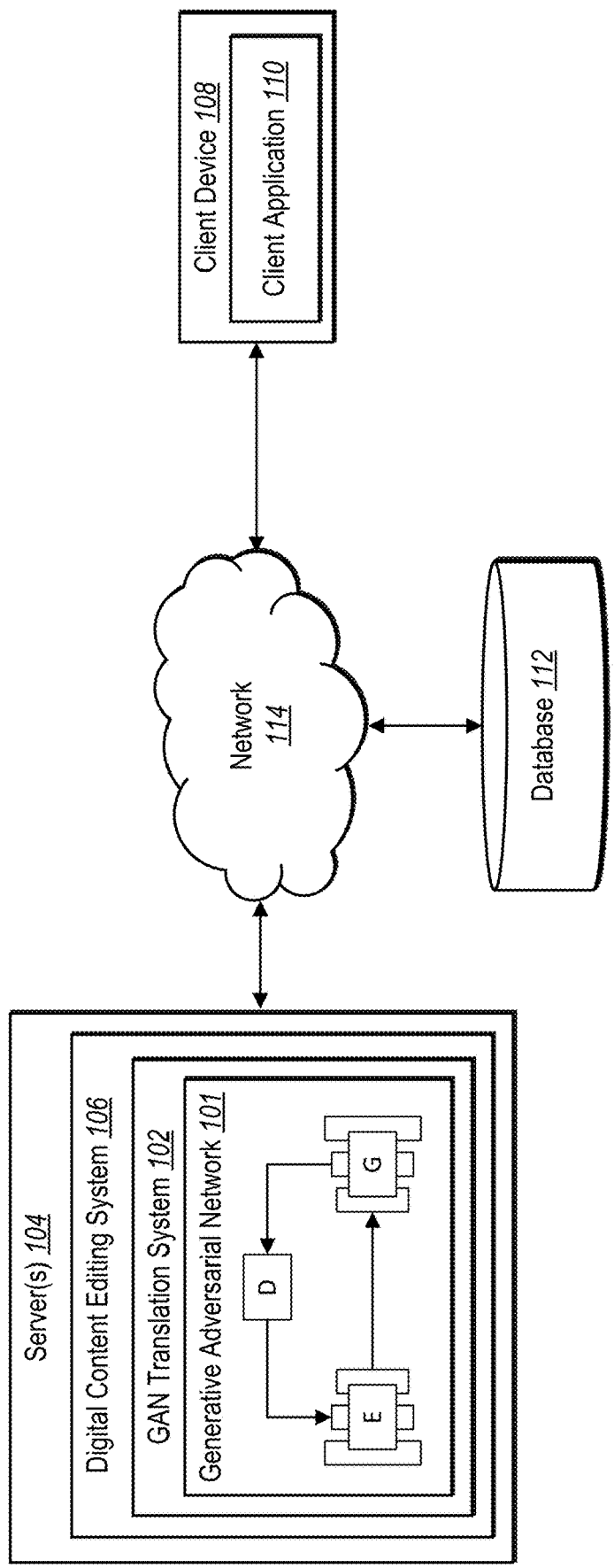
FIG. 1 illustrates an example system environment in which a GAN translation system operates in accordance with one or more implementations.

One or more embodiments described herein include a GAN translation system that generates target generative adversarial neural networks using GAN-to-GAN translation for cross-domain consistency. More specifically, the GAN translation system adapts or modifies parameters of a source generative adversarial neural network learned from a source domain using few-shot adaptation techniques to generate a target generative adversarial neural network that generates digital images in a target domain while maintaining the diversity of the source domain. In particular, in one or more embodiments, the GAN translation system learns parameters for the target generative adversarial neural network from parameters of the source generative adversarial neural network using a novel cross-domain distance consistency constraint and an anchor-based approach to enforcing realism with respect to the target domain. For example, the GAN translation system modifies parameters of the source generative adversarial neural network by utilizing a cross-domain distance consistency loss to maintain consistency and diversity from the source domain. In addition, in certain embodiments, the GAN translation system utilizes an anchor-based approach to enforce different degrees or measures of realism for digital images sampled from different portions of a latent space. In some embodiments, the GAN translation system utilizes the target generative adversarial neural network to generate digital images in the target domain.

As just mentioned, in one or more embodiments the GAN translation system adapts a source generative adversarial neural network using parameters learned from a source domain to generate digital images belonging to a target domain using a relatively small set of example samples. Indeed, unlike domain adaptation approaches like image-to-image translation, the GAN translation system adapts the generative models themselves (as opposed to adapting domains), resulting in a GAN-to-GAN translation. To elaborate, in one or more embodiments, the GAN translation system utilizes a few-shot adaptation strategy to modify parameters associated with a source generative adversarial neural network to generate a target generative adversarial neural network that generates digital images corresponding to a target domain. For instance, the GAN translation system utilizes a feature-level cross-domain distance consistency constraint together with an anchor-based approach to enforcing realism while avoiding over-fitting.

As mentioned, in some embodiments, the GAN translation system utilizes a cross-domain distance consistency constraint. For example, by using the cross-domain distance consistency constraint, the GAN translation system encourages a target diversity distribution to resemble a source diversity distribution. More specifically, the GAN translation system encourages a diversity of digital images generated by a target generative adversarial neural network (e.g., within a target domain) to resemble a diversity of digital images generated by a source generative adversarial neural network (e.g., within a source domain).

In certain embodiments, the GAN translation system distills or determines the diversity of the source domain by determining differences and/or similarities between digital images (at a feature level) generated by the source generative adversarial neural network. For example, the GAN translation system generates feature vectors for digital images generated from latent vectors utilizing both the source generative adversarial neural network and the target generative adversarial neural network. In addition, the GAN translation system uses a cross-domain distance consistency constraint to encourage distances between pairs of feature vectors generated by the target generative adversarial neural network to resemble distances between pairs of feature vectors generated by the source generative adversarial neural network from the same latent vectors. Additional detail regarding using the cross-domain distance consistency constraint to encourage diversity in the target domain is provided below with reference to the figures.

As further mentioned above, in some cases, the GAN translation system utilizes an anchor-based approach to generate realistic digital images. For instance, the GAN translation system enforces different measures, levels, or degrees of realism for digital images sampled from different regions of a latent space. Indeed, in some embodiments, the GAN translation system divides the latent space into different regions. For example, the GAN translation system designates or defines anchor regions as regions or portions for enforcing higher measures of realism. In some cases, the anchor regions make up a relatively small percentage or subset of the entire latent space.

In one or more embodiments, the GAN translation system enforces or encourages a first measure of realism for digital images sampled from anchor regions and a second measure of realism for digital images sampled from outside the anchor regions. For example, the GAN translation system enforces complete or image-level realism only on digital images sampled from the anchor regions. Indeed, in these or other embodiments, the GAN translation system forces a digital image generated from a latent vector sampled from an anchor region to resemble (or match) a digital image from among a set of example digital images in a target domain (a few-shot target domain set). In addition, in some embodiments, the GAN translation system enforces partial or patch-level realism on digital images generated from latent vectors sampled from regions of the latent space outside of the anchor regions.

In one or more embodiments, the GAN translation system generates modified digital images utilizing one or both of the cross-domain distance consistency constraint and/or the anchor-based realism enforcement. For example, the GAN translation system learns and/or modifies parameters of a source generative adversarial neural network learned based on a source domain. Indeed, in some cases, the GAN translation system modifies a source generative adversarial neural network using the cross-domain distance consistency constraint and/or the anchor-based realism enforcement approach to generate a target or modified generative adversarial neural network.

In certain embodiments, the GAN translation system also encourages or enforces cross-domain correspondences between digital images. For example, the GAN translation system produces a one-to-one correspondence between a digital image belonging to a source domain and a modified digital image belonging to a target domain. Indeed, as a byproduct of utilizing the cross-domain distance consistency constraint and/or the anchor-based realism enforcement approach, the GAN translation system ensures cross-domain correspondences between digital images generated by a source generative adversarial neural network and digital images generated by a target generative adversarial neural network. Thus, given the same noise or latent vector, a source generative adversarial neural network and a target generative adversarial neural network generate two corresponding digital images in different domains (e.g., the structure/content of the digital image will be similar have a different style depending upon the domain).

As suggested above, embodiments of the GAN translation system provide several advantages over conventional digital image generation systems. For example, embodiments of the GAN translation system provide improved accuracy over conventional systems. As opposed to conventional systems trained using limited examples that result in overfitting and diversity loss in generated digital images, the GAN translation system generates more diverse digital images by utilizing a cross-domain distance consistency constraint and an anchor-based realism enforcement approach. Indeed, even in few-shot digital image generation, which causes overfitting in many conventional systems, the GAN translation system nevertheless generates accurate, diverse, and realistic digital images as compared to these conventional systems.

In addition, certain embodiments of the GAN translation system improve efficiency over conventional digital image generation systems. For example, compared to conventional systems that require expensive training and retraining over large datasets, the GAN translation system leverages a pretrained model for few-shot adaptation. Indeed, the GAN translation system saves computing resources by updating source-domain parameters through few-shot adaptation and GAN-to-GAN translation over a small example dataset in the target domain instead of relearning new parameters over a large set of domain samples. Thus, compared to conventional systems, some embodiments of the GAN translation system require fewer computing resources such as processing time, processing power, and memory to learn parameters of a generative adversarial neural network.

Beyond improving accuracy and efficiency, certain embodiments of the GAN translation system provide a new functionality which conventional systems do not provide. Specifically, the GAN translation system generates target adversarial neural networks that have cross-domain correspondences with a source adversarial neural network. Indeed, in some cases, the GAN translation system ensures a one-to-one relationship such that a source digital image maps directly to a given target digital image. In other words, utilizing the same noise vector as input to both the source generative adversarial neural network and the target generative adversarial neural network with result in similar image content produced in the style of the source domain and the style of the target domain. In this manner, the GAN translation system allows for generation of a corresponding image in different domains (e.g., the source domain and a target domain or multiple target domains), allowing one to see how a face or other image appears in various domains (e.g., the same face as a baby, as an older adult, or painted by a famous artist).

As suggested by the foregoing discussion, this disclosure utilizes a variety of terms to describe features and benefits of the deep image manipulation system. Additional detail is hereafter provided regarding the meaning of these terms as used in this disclosure. In particular, the term the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on input(s) provided to the neural network. In some cases, a neural network refers to an algorithm (or set of algorithms) that implements deep learning techniques to model high-level abstractions in data.

Relatedly, the term "generative adversarial neural network" (sometimes simply "GAN") refers to a neural network that is tuned or trained via an adversarial process to generate an output from an input. In some cases, a generative adversarial neural network includes multiple constituent neural networks such as an encoder neural network, a generator neural network, and a discriminator neural network. For example, an encoder neural network encodes a latent vector into one or more feature vectors. A generator neural network generates a digital image by decoding the feature vectors (e.g., from the encoder neural network). During training, a discriminator neural network, in competition with the generator neural network, analyzes a generated digital image from the generator neural network to determine whether the generated digital image is real (e.g., from a set of stored digital images) or fake (e.g., not from the set of stored digital images). The discriminator neural network also causes the GAN translation system to modify parameters of the encoder neural network and/or the generator neural network to learn to eventually generate digital images that fool the discriminator neural network into indicating that a generated digital image is a real digital image.

As mentioned, in some embodiments the GAN translation system adapts a generative adversarial neural network with parameters learned from a source domain to generate digital images belonging to a target domain. As used herein, the term "source domain" refers to a domain used as a basis for learning initial parameters for a source generative adversarial neural network. For example, a source domain includes digital images having a particular appearance or style, such as a set of self-portraits, landscapes, or city skylines. As used herein, a source domain includes a large number of example digital images (hundreds or thousands) for training the source generative adversarial neural network.

Relatedly, the term "target domain" refers to a domain that the GAN translation system uses to adapt or modify parameters of a source generative adversarial neural network. For example, a target domain includes a relatively small set of example digital images (e.g., one, five, ten, twenty, or fifty digital images) having a common style or appearance, such as cartoon faces, baby portrait images, artistic images, cloudy skies, or ramshackle buildings. In some cases, the GAN translation system uses the target domain for few-shot adaptation to generate a target generative adversarial neural network capable of generating digital images including a style of the target domain.

In one or more embodiments, the GAN translation system determines relative pairwise distances or relative feature distances between digital images (or more specifically between digital image feature vectors). As used herein, the term "relative feature distance" refers to a relative distance or difference between feature vectors (e.g., within a feature space) corresponding to digital images. For example, a relative feature distance indicates a measure of similarity (or difference) between digital images or their corresponding feature vectors. In some embodiments, the modifier "relative" indicates that the distance is not necessarily absolute, but rather indicates relative distances between particular digital images or feature vectors in relation to one another.

Similarly, the term "relative pairwise distance" refers to a relative distance or difference between a pair of digital images or corresponding digital image feature vectors. For example, a relative pairwise distance indicates a distance between digital images or digital image feature vectors of a given pair. Indeed, in some cases, the GAN translation system determines relative pairwise distances between pairs of digital images of a source domain and modifies parameters of a generative adversarial neural network to preserve those relative pairwise distances when generating digital images belonging to a target domain.

In some embodiments, the GAN translation system preserves relative feature distances or relative pairwise distances by utilizing a cross-domain distance consistency constraint or loss. As used herein, the term "cross-domain distance consistency loss" refers to a loss function that enforces similarity in the distribution of pairwise distances of generated samples (e.g., digital images) before and after adaptation. For example, the GAN translation system implements a cross-domain distance consistency loss to encourage or enforce preservation of relative pairwise distances for a generative adversarial neural network before and after adaptation from a source domain to a target domain.

To further reduce overfitting, in some embodiments, the GAN translation system utilizes an anchor-based strategy for enforcing realism on digital images. For instance, the GAN translation system defines anchor regions within a latent space and enforces different measures of realism for digital images generated from latent vectors sampled from within the anchor regions than for digital images generated from latent vectors sampled from non-anchor regions of the latent space. As used herein, the term "anchor region" refers to a portion within a latent space where realism is treated differently than other portions of the latent space. For example, an anchor region refers to a relatively small area of a latent space that "anchors" complete, image-level realism. Indeed, in some cases, the GAN translation system enforces image-level realism only for digital images generated from latent vectors sampled from anchor regions. The GAN translation system enforces patch-level realism on digital images sampled generated from region of the latent space outside the anchor regions.

As used herein, the term "realism" refers to an indication or a measure of a digital image being realistic or belonging to domain of digital images. For instance, the GAN translation system determines whether or not a digital image is real (e.g., belongs to a set of actual, stored digital images) or fake (e.g., generated and not an actual, stored digital image). Thus, "image-level realism" refers to an indication, a prediction, or a measure that an entire digital image is real. Conversely, "patch-level realism" refers to an indication, a prediction, or a measure that one or more patches of a digital image are real (but not necessarily an entire image).

In certain described embodiments, the GAN translation system ensures cross-domain correspondences between digital images generated by source and target generative adversarial neural networks. As used herein, the term "cross-domain correspondence" refers to a relationship between a digital image from a source domain and a digital image belonging to a target domain. For example, cross-domain correspondence includes a one-to-one relationship or connection between two digital images (one in the source domain and one in the target domain) generated from the same noise or latent vector using a generative adversarial neural network before and after adaptation from a source domain to a target domain.

As mentioned, the GAN translation system generates digital images in a target domain utilizing a target generative adversarial neural network trained using GAN-to-GAN few-shot adaptation. As used herein, the term "few-shot adaptation" refers to a process of learning or updating parameters for a generative model using relatively few samples. For example, few-shot adaptation includes modifying parameters of a pretrained or source generative adversarial neural network (e.g., with parameters learned from a source domain) utilizing a small set of digital images belonging to a target domain (e.g., less than fifty, twenty, ten, or five example digital images).

Additional detail regarding the GAN translation system will now be provided with reference to the figures. For example, FIG. 1 illustrates a schematic diagram of an example system environment for implementing a GAN translation system 102 in accordance with one or more embodiments. An overview of the GAN translation system 102 is described in relation to FIG. 1. Thereafter, a more detailed description of the components and processes of the GAN translation system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 11.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single client device 108, in some embodiments the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, edit, modify, or generate digital content such as a digital image. Thus, the GAN translation system 102 on the server(s) 104 receives information or instructions to generate a modified digital image from a digital image stored within the database 112.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image generation interface and/or a digital image editing interface. For example, a user interacts with the client application 110 to provide user input to generate and/or modify one or more digital images. In one or more implementations the client application 110 is a digital content editing application that is supported or hosted by the digital content editing system 106.

As illustrated in FIG. 1, the environment includes the server(s) 104. The server(s) 104 generates, tracks, stores, processes, receives, and transmits electronic data, such as digital image modifications, modifications to a generative adversarial neural network, and indications of user interactions. For example, the server(s) 104 receives data from the client device 108 in the form of an indication of user interaction to generate or modify a digital image. In addition, the server(s) 104 transmits data to the client device 108 to provide a modified digital image resulting from learning or modifying parameters of a generative adversarial neural network. Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 comprises a content server, an application server, a communication server, a web-hosting server, a multidimensional server, or a machine learning server.

As shown in FIG. 1, the server(s) 104 also includes the GAN translation system 102 as part of a digital content editing system 106. The digital content editing system 106 communicates with the client device 108 to perform various functions associated with the client application 110 such as storing and managing a repository of digital images, modifying digital images, and providing modified digital images for display. For example, the GAN translation system 102 communicates with the database 112 to access a repository of digital images and a stored generative adversarial neural network. Indeed, as further shown in FIG. 1, the environment includes a database 112. In particular, the database 112 stores information such as a repository of digital images as well as a generative adversarial neural network.

In addition, the GAN translation system includes a generative adversarial neural network 101. In particular, the generative adversarial neural network 101 includes an encoder neural network, a generator neural network, and a discriminator neural network. Indeed, the GAN translation system 102 learns parameters for, or modifies the generative adversarial neural network 101 to generate digital images using few-shot adaptation from a source domain to a target domain. For instance, the GAN translation system 102 performs multiple rounds of parameter learning for the generative adversarial neural network 101, determining measures of loss associated with the discriminator neural network and/or the generator neural network, and modifying parameters to reduce the measures of loss (e.g., to satisfy a loss threshold).

Although FIG. 1 illustrates a particular arrangement of the environment, in some embodiments, the environment has a different arrangement of components and/or may have a different number or set of components altogether. For instance, in some embodiments, the GAN translation system 102 is implemented by (e.g., located entirely or in part on) the client device 108 and/or a third-party device. In addition, in one or more embodiments, the client device 108 communicates directly with the GAN translation system 102, bypassing the network 114. Further, in some embodiments, the database 112 is located external to the server(s) 104 (e.g., in communication via the network 114) or located on the server(s) 104 and/or on the client device 108.

For example, in one or more implementations, the GAN translation system 102 on the server(s) 104 generates a target generative adversarial neural network from a source generative adversarial neural network. In such implementations, the client device 108 then downloads or otherwise obtains the target generative adversarial neural network from the server(s) 104. The client device 108 then utilizes the target generative adversarial neural network independently from the GAN translation system 102 on the server(s) 104 to generate digital images in the target domain.

Figure 2:
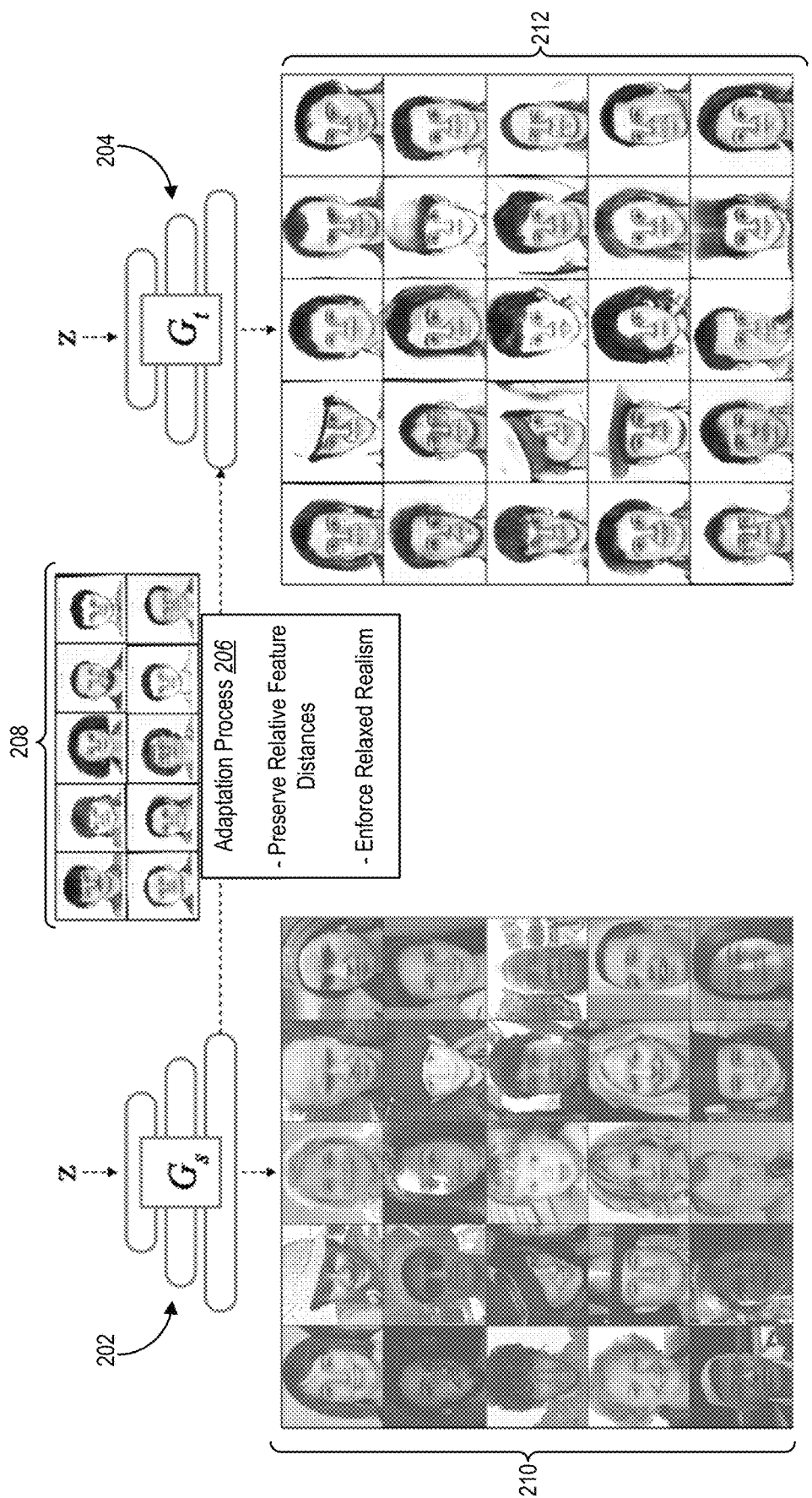
FIG. 2 illustrates an overview of utilizing GAN translation to adapt a source generative adversarial neural network to a target domain in accordance with one or more implementations.

As mentioned, in one or more embodiments, the GAN translation system 102 modifies parameters of a generative adversarial neural network using few-shot adaptation from a source domain to a target domain. In particular, the GAN translation system 102 modifies a generative adversarial neural network to generate digital images having a style or appearance of a target domain. FIG. 2 illustrates modifying parameters of a source generative adversarial neural network to generate a target generative adversarial neural network that generates digital images in target domain in accordance with one or more embodiments. The description of FIG. 2 provides an overview of adapting a source generative adversarial neural network from generating digital images in a source domain to generating digital images in a target domain, while maintaining cross-domain consistency and realism. Additional detail regarding the various acts involved in the process is provided below with reference to subsequent figures.

As illustrated in FIG. 2, the GAN translation system 102 accesses or utilizes a source generative adversarial neural network 202 (represented by G０). In particular, the GAN translation system 102 leverages a source generative adversarial neural network 202 that is pretrained on digital images belonging to a source domain. For instance, the source generative adversarial neural network 202 includes parameters learned from a source domain such as portrait images. Thus, the GAN translation system 102 utilizes the source generative adversarial neural network 202 to generate the set of digital images 210 belonging to the source domain from noise vectors "z".

As further illustrated in FIG. 2, the GAN translation system 102 utilizes an adaptation process 206 to modify, update, or adapt the parameters of the source generative adversarial neural network 202 to generate a modified or target generative adversarial neural network 204 (represented by $G_t$). More specifically, the GAN translation system 102 modifies the parameters of the source generative adversarial neural network 202 to accurately and efficiently generate the set of modified digital images 212 belonging to the target domain from the noise vectors "z". In some embodiments, the GAN translation system 102 modifies the parameters of the source generative adversarial neural network 202 using an adaptation process 206 over the few-shot example digital images 208 of a target domain. Indeed, the GAN translation system 102 modifies parameters of the source generative adversarial neural network 202 to generate the target generative adversarial neural network 204 that then generates the set of digital images 212 that match the style or appearance of the few-shot digital images 208. As shown, each digital image at a particular location within the set of digital images 210 corresponds to a counterpart digital image within the set of digital images 212. In other words, the source generative adversarial neural network 202 will generate a given digital image from a particular noise vector (e.g., the image in the top right corner of digital images 210). The target generative adversarial neural network 204 will generate from the same particular noise vector a corresponding digital image albeit in the target domain style (e.g., the image in the top right corner of digital images 212).

As mentioned above, the GAN translation system 102 implements the adaptation process 206 to generate the target generative adversarial neural network 204 from the source generative adversarial neural network 202. In particular, the GAN translation system 102 learns parameters for the target generative adversarial neural network 204 through the adaptation process 206. As shown, in one or more embodiments, the GAN translation system 102 utilizes an adaptation process 206 including processes that: 1) preserve relative feature distances and 2) enforce relaxed realism.

As a basis for the adaptation process 206, the GAN translation system 102 samples a batch of noise vectors to use for generating both the set of digital images 210 belonging to the source domain and for generating the set of modified digital images 212 belonging to the target domain. Specifically, to generate the set of digital images 210 of the source domain, the GAN translation system 102 samples a batch of noise vectors, represented by z. For example, the GAN translation system 102 samples noise vectors $z_1$, $z_2$, ..., $z_n$ and generates the set of digital images 210 (represented by $I_1^s, I_2^s, \ldots, I_n^s$) using the noise vectors z. Additionally, the GAN translation system 102 generates the set of target digital images 212 (represented by $I_1^t, I_2^t, \ldots, I_n^t$) from the same batch of noise vectors z.

As mentioned, the GAN translation system 102 further preserves the relative feature distances between digital images. To preserve relative feature distances, the GAN translation system 102 determines relative pairwise distances in a feature space among pairs of digital images. More specifically, the GAN translation system 102 determines distances between pairs of features vectors corresponding to digital images from among the set of digital images 210 belonging to the source domain. In some cases, the GAN translation system 102 selects a first digital image and a second digital image from the set of digital images 210 to include within a pair. In addition, the GAN translation system 102 generates or extracts a digital image feature vector from each digital image to compare within a feature space. Thus, the GAN translation system 102 determines a relative pairwise distance in the feature space between a pair of digital image feature vectors.

In addition, the GAN translation system 102 preserves the relative feature distances or the relative pairwise distances between pairs of digital images (or their corresponding feature vectors) from the source domain and the target domain. In some embodiments, the GAN translation system 102 selects pairs of digital images corresponding to pairs of noise vectors for comparison. For example, if the pair [$z_1$, $z_2$] results in more similar digital images than the pair [$z_1$, $z_3$] in the source domain (e.g., among the set of digital images 210), then the GAN translation system 102 preserves the relative order of similarity for the target domain as well. For example, the GAN translation system 102 learns parameters for the target generative adversarial neural network 204 to ensure that [$z_1$, $z_2$] results in more similar digital images than [$z_1$, $z_3$] in the target domain as well (e.g., among the set of modified digital images 212).

As mentioned, the GAN translation system 102 utilizes the adaptation process 206 to enforce relaxed realism. Indeed, because the few training samples from the few-shot digital images 208 only form a small subset of a target distribution, the GAN translation system 102 enforces realism in two different measures to further reduce overfitting. More particularly, the GAN translation system 102 applies image-level adversarial loss on synthesized digital images that should map to one of the real samples from the few-shot digital images 208. For all other synthesized digital images, the GAN translation system 102 enforces only patch-level adversarial loss. In this way, the GAN translation system 102 forces only a small subset of generated digital images to match one of the few-shot digital images 208, thereby reducing overfitting to the few-shot digital images 208.

Indeed, the GAN translation system 102 enforces different measures of realism on digital images sampled from different regions of a latent space. To elaborate, the GAN translation system 102 divides or splits the latent space into different regions, defining some regions as anchor regions. For digital images generated from latent vectors sampled from anchor regions, the GAN translation system 102 enforces complete, image-level realism, where the generator generates a digital image matching a digital image from the set of few-shot digital images 208. For digital images generated from latent vectors sampled from regions outside of the anchor regions, the GAN translation system 102 enforces only partial, patch-level realism.

By utilizing the adaptation process 206 to preserve relative feature distances and to enforce relaxed realism, the GAN translation system 102 accurately generates the target generative adversarial neural network 204, which in turns generates the set of digital images 212 in the target domain. Indeed, the GAN translation system 102 reduces or eliminates the overfitting that hampers performance of many conventional systems by utilizing these techniques. Additionally, the GAN translation system 102 automatically (e.g., without user input) maintains cross-domain correspondences between digital images generated by the source and target generative adversarial neural networks from the same latent vectors. For instance, utilizing the same batch of noise vectors z, the GAN translation system 102 ensures one-to-one correspondences between digital images in the source domain (e.g., in the set of digital images 210) and digital images in the target domain (e.g., digital images in the set of modified digital images 212). For example, the bottom-right digital images map directly to their counterparts in the same location. When the source domain and the target domain are unrelated, however (e.g., cars vs. caricatures), the GAN translation system 102 may not directly model the full target distribution but nonetheless interesting part-level correspondences are observable.

Figure 3:
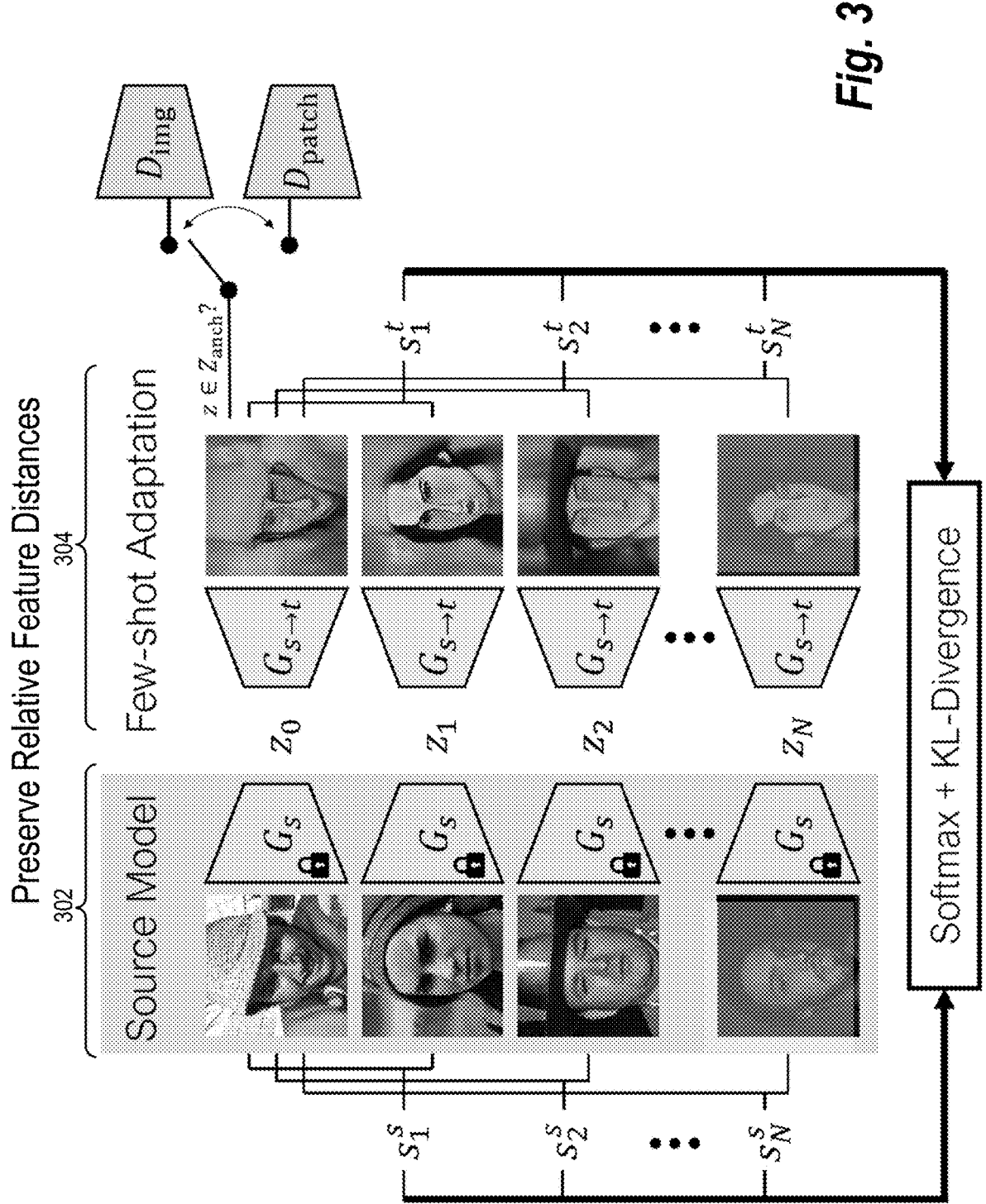
FIG. 3 illustrates a schematic diagram illustrating a process for GAN translation that preserves relative feature distances in accordance with one or more implementations.

As mentioned above, in some embodiments, the GAN translation system 102 preserves relative feature distances or relative pairwise distances between digital images or digital image feature vectors. In particular, the GAN translation system 102 enforces a target generative adversarial neural network to preserve relative feature distances associated with digital images generated by a source generative adversarial neural network. FIG. 3 illustrates learning parameters of a target generative adversarial neural network from a source generative adversarial neural network while preserving relative feature distances in accordance with one or more embodiments.

As illustrated in FIG. 3, the GAN translation system 102 learns parameters for a target generative adversarial neural network 304, represented by $G_{s \to t}$, from a source generative adversarial neural network 302, represented by $G_s$. Indeed, the GAN translation system 102 leverages a source generative adversarial neural network 302 that includes parameters learned from a large source dataset $\mathcal{D}_s$. Utilizing the source generative adversarial neural network 302, the GAN translation system 102 maps noise vectors $z \sim p_z(z) \subset \mathcal{Z}$ into digital images x, where the noise vectors z are extracted from a simple distribution in a low-dimensional space.

As mentioned, the GAN translation system 102 learns parameters for a target generative adversarial neural network 304 by modifying the parameters of the source generative adversarial neural network 302. Indeed, the GAN translation system 102 modifies the learned parameters of the source generative adversarial neural network 302 to generate the target generative adversarial neural network 304. As part of the process to ultimately learn the parameters (e.g., weights) for the target generative adversarial neural network 304, the GAN translation system 102 initializes the parameters to those of the source generative adversarial neural network 302. In addition, the GAN translation system 102 fits or modifies the parameters based a small target dataset $\mathcal{D}_t$ (e.g., the few-shot example digital images 208).

In certain embodiments, the GAN translation system 102 obtains a naïve translation by using a GAN training procedure with a learned discriminator neural network D. Additionally, utilizing a non-saturating GAN objective, the GAN translation system 102 learns parameters in accordance with:

$$\mathcal{L}_{adv}(G, D) = D(G(z)) - D(x) \text{ and}$$

$$G^*_{s \to t} = \mathbb{E}_{z \sim p_z(z), x \sim D_t} \operatorname*{argminmax}_{G \quad D} \mathcal{L}_{adv}(G, D)$$

where $\mathcal{L}_{adv}(G, D)$ represents an adversarial loss between a generator neural network G and a discriminator neural network D (e.g., indicating a likelihood that a generated digital image is real or fake), $\mathbb{E}$ represents an expectation or an expected value (e.g., for the difference between data in the source distribution and data in the target distribution), $G^*_{s \to t}$ represents a modified generative adversarial neural network, and the remaining terms are as defined above. In some cases, using the above objective function for $G^*_{s \to t}$ is effective with a target dataset that exceeds 1000a training samples. However, in extreme few-shot settings where the target dataset includes few training samples (e.g., one, five, or ten), the above objective function overfits.

Thus, in one or more embodiments, the GAN translation system 102 modifies the objective function utilizing a cross-domain distance consistency loss and an anchor-based approach for enforcing relaxed realism, thereby reducing overfitting. In particular, the GAN translation system 102 prevents generated digital images from collapsing onto common target samples, which often renders the generated digital images perceptually indistinct. Specifically, the GAN translation system 102 samples a batch of N+1 noise vectors $\{z_n\}_0^N$ and uses their pairwise similarities in a feature space to construct N-way probability distributions for each digital image.

As illustrated in FIG. 3, the GAN translation system 102 learns parameters for the target generative adversarial neural network 304 from the perspective of the $z_0$ noise vector. Indeed, the GAN translation system 102 determines a probability distribution of the source generative adversarial neural network 302 and the target generative adversarial neural network 304 for the $i^{th}$ noise vector, as given by:

$$y_i^{s,l} = Softmax\left(\{sim(G_s^l(z_i), G_s^l(z_j))\}_{\forall_{i \neq j}}\right)$$

$$y_i^{s \to t,l} = Softmax\left(\{sim(G_{s \to t}^l(z_i), G_{s \to t}^l(z_j))\}_{\forall_{i \neq j}}\right)$$

where $y_i^{s,l}$ represents a probability distribution for the source generative adversarial neural network 302 corresponding to $i^{th}$ noise vector, $y_i^{s \to t,l}$ represents a probability distribution for the target generative adversarial neural network 304 corresponding to $i^{th}$ noise vector, and sim(•) represents a cosine similarity between generator activations at the $l^{th}$ layer.

In other words, as shown by FIG. 3, the GAN translation system 102 generates digital images from the $z_0$ noise vector, the $z_1$ noise vector, the $z_2$ noise vector, and the $z_n$ noise vector utilizing both the source generative adversarial neural network 302 and the target generative adversarial neural network 304. As part of generating the digital images, each of the source generative adversarial neural network 302 and the target generative adversarial neural network 304 generate activations or feature vectors at each layer l in the respective neural networks. The GAN translation system 102 generates a first relative feature distance $S_1^s$ between the activations or feature vector of a given layer of the source generative adversarial neural network 302 generated from the $z_0$ noise vector and the $z_1$ noise vector. Similarly, the GAN translation system 102 generates a second relative feature distance $S_2^s$ between the activations or feature vector of the given layer of the source generative adversarial neural network 302 generated from the $z_0$ noise vector and the $z_1$ noise vector. This process is repeated so the GAN translation system 102 generates a Nth relative feature distance $S_N^s$ between the activations or feature vector of the given layer of the source generative adversarial neural network 302 generated from the $z_0$ noise vector and the $z_N$ noise vector. Along related lines, the GAN translation system 102 generates a first relative feature distance $S_1^t$ between the activations or feature vector of a given layer of the target generative adversarial neural network 304 generated from the $z_0$ noise vector and the $z_1$ noise vector. Similarly, the GAN translation system 102 generates a second relative feature distance $S_2^t$ between the activations or feature vector of the given layer of the target generative adversarial neural network 304 generated from the $z_0$ noise vector and the $z_1$ noise vector. This process is repeated so the GAN translation system 102 generates a Nth relative feature distance SN between the activations or feature vector of the given layer of the target generative adversarial neural network 304 generated from the $z_0$ noise vector and the $z_N$ noise vector.

The GAN translation system 102 the utilizes the Softmax+KL-Divergence to ensure that the relative pairwise distances (the comparative relationship between $S_1^s$ and $S_2^s$ is maintained by $S_1^t$ and $S_2^t$ etc.) by backpropagating based on the Softmax+KL-Divergence to update the parameters of the target generative adversarial neural network 304 without changing the parameters of the source generative adversarial neural network 302 (as indicated by the locks). The GAN translation system 102 then repeats this process for the various layers of the source and target generative adversarial neural networks.

In certain cases, the GAN translation system 102 implements particular contrastive learning techniques to convert similarities into probability distributions for unsupervised representation learning. Additionally, the GAN translation system 102 utilizes perceptual feature losses to show that activations on multiple layers on discriminative neural networks help preserve similarity. To help preserve relative feature distances or relative pairwise distances, the GAN translation system 102 encourages the target generative adversarial neural network 304 to have similar distributions to the source generative adversarial neural network 302 across layers and digital image instances. For instance, the GAN translation system 102 utilizes Kullback-Leibler divergence as part of determining a cross-domain distance consistency loss to encourage this similarity, as given by:

$$\mathcal{L}_{dist}(G_{s \to t}, G_s) = \mathbb{E}_{\{z_i \sim p_z(z)\}} \sum_{l,i} D_{KL}\left(y_i^{s \to t,l} \| y_i^{s,l}\right)$$

where $\mathcal{L}_{dist}(G_{s \to t}, G_s)$ represents a cross-domain distance consistency loss between the source generative adversarial neural network 302 and the target generative adversarial neural network 304, $D_{KL}(•)$ represents a Kullback-Leibler divergence, and the remaining terms are as defined above.

In some embodiments, the objective function for the relative distance preservation is expressed differently. For example, the GAN translation system 102 utilizes relative distance objective function, as given by:

$$\mathcal{L}_{dist} = $$
$$kl\_div\left(\begin{array}{l}Softmax(d(G_s(z_0), G_s(z_1)), d(G_s(z_0), G_s(z_2)), d(G_s(z_0), G_s(z_n))) \\ Softmax(d(G_t(z_0), G_t(z_1)), d(G_t(z_0), G_t(z_2)), d(G_t(z_0), G_t(z_n)))\end{array}\right)$$

where d(•) represents a distance function (e.g., a cosine distance function), kl_div(•) represents a Kullback-Leibler divergence to measure similarity between relative distances, and the other variables are as defined above. In certain embodiments, the GAN translation system 102 compares similarity in a feature space by using activations of intermediate layers of the respective neural networks as digital image feature vectors for digital images G(z). By utilizing this objective function, the GAN translation system 102 preserves the bijective relation between feature space and digital image space in the target generative adversarial neural network 304, which in turn helps preserve diversity in the generations of the target generative adversarial neural network 304.

As illustrated in FIG. 3, in one or more implementations, the GAN translation system 102 modifies or learns parameters for the target generative adversarial neural network 304 utilizing activations or feature vectors one layer at a time. To elaborate, the GAN translation system 102 learns parameters based on activations of $l^{th}$ layer and repeats the process for other layers (e.g., to the $N^{th}$ layer) of the target generative adversarial neural network 304 as well. Indeed, the GAN translation system 102 modifies parameters for each round of learning parameters to reduce or minimize the cross-domain distance consistency loss (or the Kullback-Leibler divergence). By thus reducing the cross-domain distance consistency loss, the GAN translation system 102 preserves the relative pairwise distances between the source domain and the target domain.

As further illustrated in FIG. 3, the GAN translation system 102 utilizes a relaxed discriminator that enforces different measures of loss depending on where the noise vector is sampled. For example, if the GAN translation system 102 samples the noise vector from an anchor region (e.g., $z \in Z_{anch}$), the GAN translation system 102 applies an image-level discriminator $D_{img}$ (or utilizes a discriminator to apply an image-level adversarial loss). Conversely, if the GAN translation system 102 samples the noise vector from outside an anchor region, then the GAN translation system 102 applies a patch-level discriminator $D_{patch}$ (or utilizes a discriminator to apply a patch-level adversarial loss).

Figure 4:
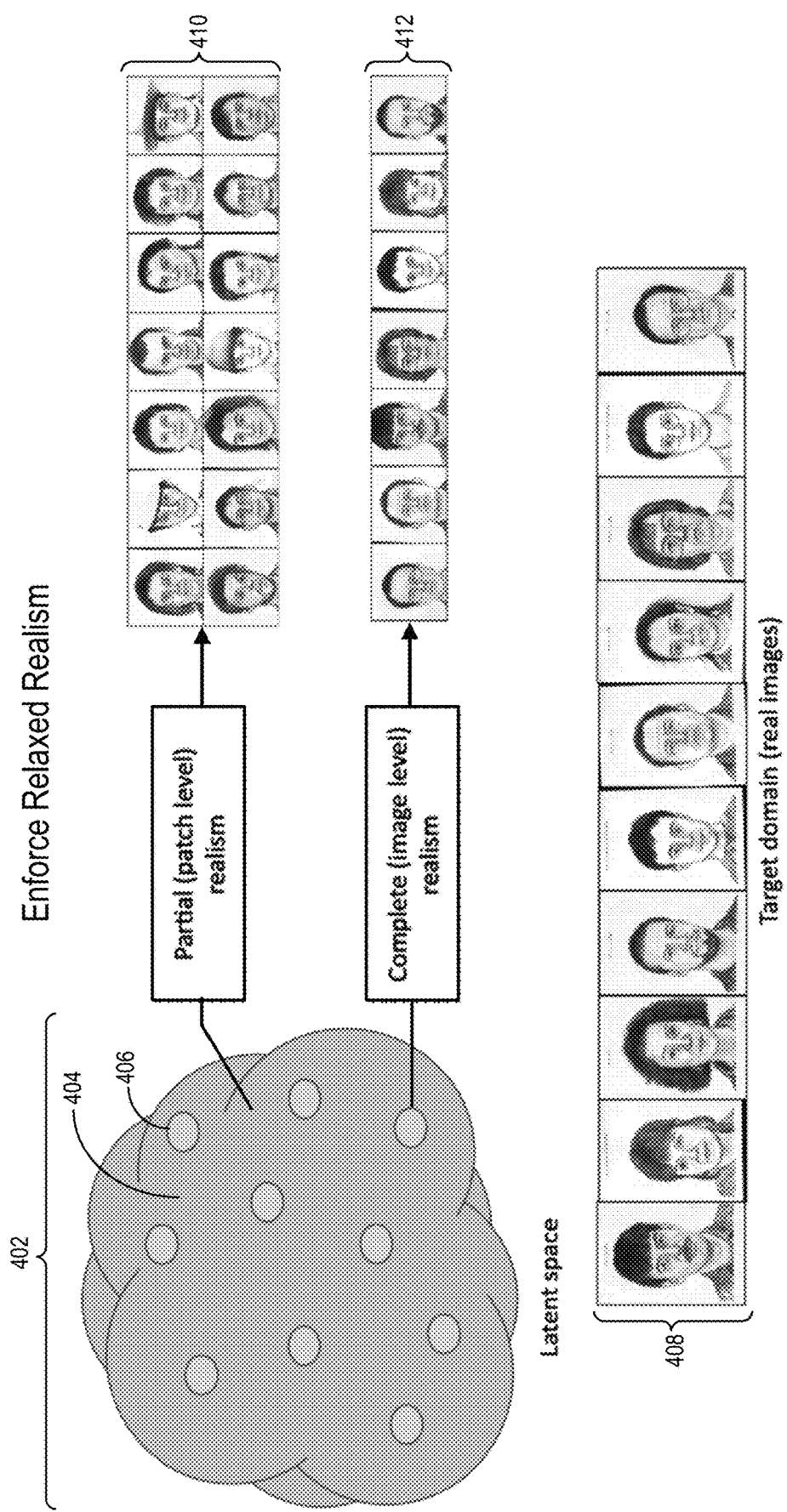
FIG. 4 illustrates a process for enforcing relaxed realism during GAN translation in accordance with one or more implementations.

As just mentioned, in some embodiments, the GAN translation system 102 utilizes different measures of loss for different portions of a latent space (the domain of all possible latent or noise vectors z). In particular, the GAN translation system 102 divides the latent space into anchor regions and non-anchor regions, respectively. FIG. 4 illustrates applying different measures of realism to digital images sampled from different portions of the latent space in accordance with one or more embodiments.

As illustrated in FIG. 4, the GAN translation system 102 defines an anchor region 406 and a non-anchor region 404 within the latent space 402. Indeed, because a very small target data size results in an increasingly strained definition of what constitutes a realistic sample, the GAN translation system 102 defines the anchor regions $Z_{anch} \subset Z$ (e.g., the anchor region 406) to form a subset of entire latent space 402. When sampling from anchor regions, as mentioned above, the GAN translation system 102 utilizes a full image discriminator $D_{img}$. When sampling from outside of the anchor regions (e.g., within the non-anchor region 404), the GAN translation system 102 utilizes a patch-level discriminator $D_{patch}$.

As mentioned, the GAN translation system 102 determines different adversarial losses for anchor regions and non-anchor regions. In certain cases, the GAN translation system 102 combines the adversarial losses for a combined adversarial loss given by:

$$\mathcal{L}'_{adv}(G, D_{img}, D_{patch}) = \mathbb{E}_{x \sim D_t}[\mathbb{E}_{z \sim s_{anch}} \mathcal{L}_{adv}(G, D_{img}) + \mathbb{E}_{z \sim p_z(z)} \mathcal{L}_{adv}(G, D_{patch})]$$

where $\mathcal{L}'_{adv}(G, D_{img}, D_{patch})$ represents the combined adversarial loss, $\mathcal{L}_{adv}(G, D_{img})$ represents an image-level adversarial loss between a generator neural network and a discriminator neural network, $\mathcal{L}_{adv}(G, D_{patch})$ represents a patch-level adversarial loss between the generator neural network and a discriminator neural network, $\mathbb{E}$ represents an expected value, and the remainder of the terms are as defined above. Over multiple rounds of parameter learning, the discriminator neural network generates adversarial losses that indicate whether or not a given digital image is real or generated, and the GAN translation system 102 modifies parameters to reduce the adversarial losses to ultimately generate a target generative adversarial neural network (e.g., the target generative adversarial neural network 304).

To define the anchor region 406, the GAN translation system 102 selects k random points (e.g., corresponding to the number of example digital images within a few-shot target set 408) within the latent space 402. In addition, the GAN translation system 102 samples from these fixed points with a small added Gaussian noise ($\sigma=0.5$). Further, the GAN translation system 102 utilizes shared parameters (e.g., weights) between the two discriminators by defining $D_{patch}$ as a subset of the larger $D_{img}$ neural network. In various embodiments, network size depends on the network architecture and layer. In some cases, the GAN translation system 102 reads off a set of layers with effective patch size ranging from 22×22 to 61×61.

As illustrated in FIG. 4, the target generative adversarial neural network generates digital images based on the GAN translation system 102 enforcing relaxed realism (e.g., a combination of image-level realism and patch-level realism), as described above. For instance, the target generative adversarial neural network generates the set of modified digital images 410 by sampling from the non-anchor region 404. Indeed, set of modified digital images 410 match the hand-drawn illustrative style of the target domain, but none of the digital images within the set of modified digital images 410 matches the actual appearance of digital images within the set of example digital images 408 for the target domain. Additionally, the target generative adversarial neural network generates the set of modified digital images 412 by sampling from one or more anchor regions. As shown, and as a result of enforcing complete, image-level realism, each of the digital images within the set of digital images 412 match (or closely resemble) the style and appearance of corresponding digital images within the set of example digital images 408.

In certain described embodiments, the GAN translation system 102 utilizes an objective function to minimize adversarial loss and cross-domain distance consistency loss to learn parameters of a target generative adversarial neural network. For instance, to learn parameters of a target generative adversarial neural network, the GAN translation system 102 implements an objective function given by:

$$G^*_{s \to t} = \underset{G}{\arg\min} \max_{D_{img}, D_{patch}} \mathcal{L}'_{adv}(G, D_{img}, D_{patch}) + \lambda L_{dist}(G, G_s)$$

where $\lambda$ represents a relational term indicating a balance or a weight between the adversarial loss and the cross-domain distance consistency loss, and the remaining terms are defined above. As defined, the modified generator is directly incentivized to borrow the domain structure from the source generator due to the inclusion of the cross-domain distance consistency loss. In some embodiments, the GAN translation system 102 utilizes a particular architecture for the source generative adversarial neural network, such as StyleGANv2 pretrained on a large dataset such as the Flickr Faces High Quality ("FFHQ") dataset. In these or other embodiments, the GAN translation system 102 uses a batch size of 4 with a high value for λ (e.g., from $10^3$ to $10^4$).

In one or more embodiments, the GAN translation system 102 performs a step for generating a target generative adversarial neural network from a source generative adversarial neural network while preserving diversity of the source domain. The above description of FIGS. 2-4, particularly the adaptation process 206 of FIG. 2 and the additional detail provided in relation to FIGS. 3-4, provide various embodiments and supporting acts and algorithms for performing a step for generating a target generative adversarial neural network from a source generative adversarial neural network while preserving diversity of the source domain. For example, in some embodiments, the step for generating a target generative adversarial neural network from the source generative adversarial neural network while preserving diversity of the source domain includes modifying parameters of a source generative adversarial neural network to preserve relative pairwise distances utilizing a cross-domain distance consistency loss as described in relation to FIG. 3. In additional embodiments, the step for generating a target generative adversarial neural network from the source generative adversarial neural network while preserving diversity of the source domain includes enforcing relaxed realism by defining anchor regions within a latent space to enforce image-level realism for digital images sampled from the anchor regions and patch-level realism for digital images sampled from outside the anchor regions as described in relation to FIG. 4. In still further embodiments, the step for generating a target generative adversarial neural network from the source generative adversarial neural network while preserving diversity of the source domain includes utilizing a cross-domain distance consistency loss as described in relation to FIG. 3 and enforcing relaxed realism as described in relation to FIG. 4

Figure 5A:
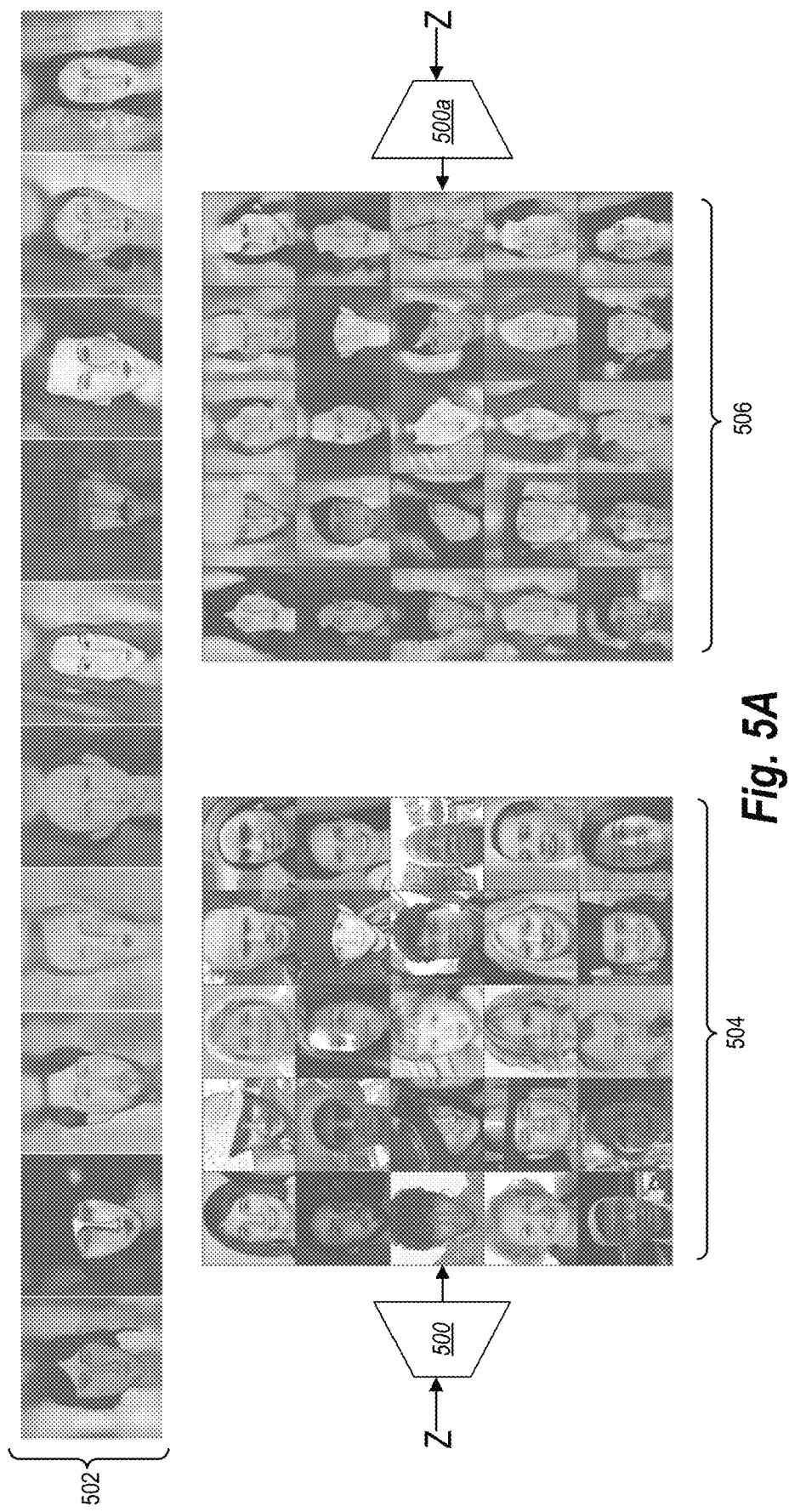
FIGS. 5A-5B illustrate corresponding digital images generated utilizing a target generative adversarial neural network and a source generative adversarial neural network in accordance with one or more implementations.
Figure 5B:
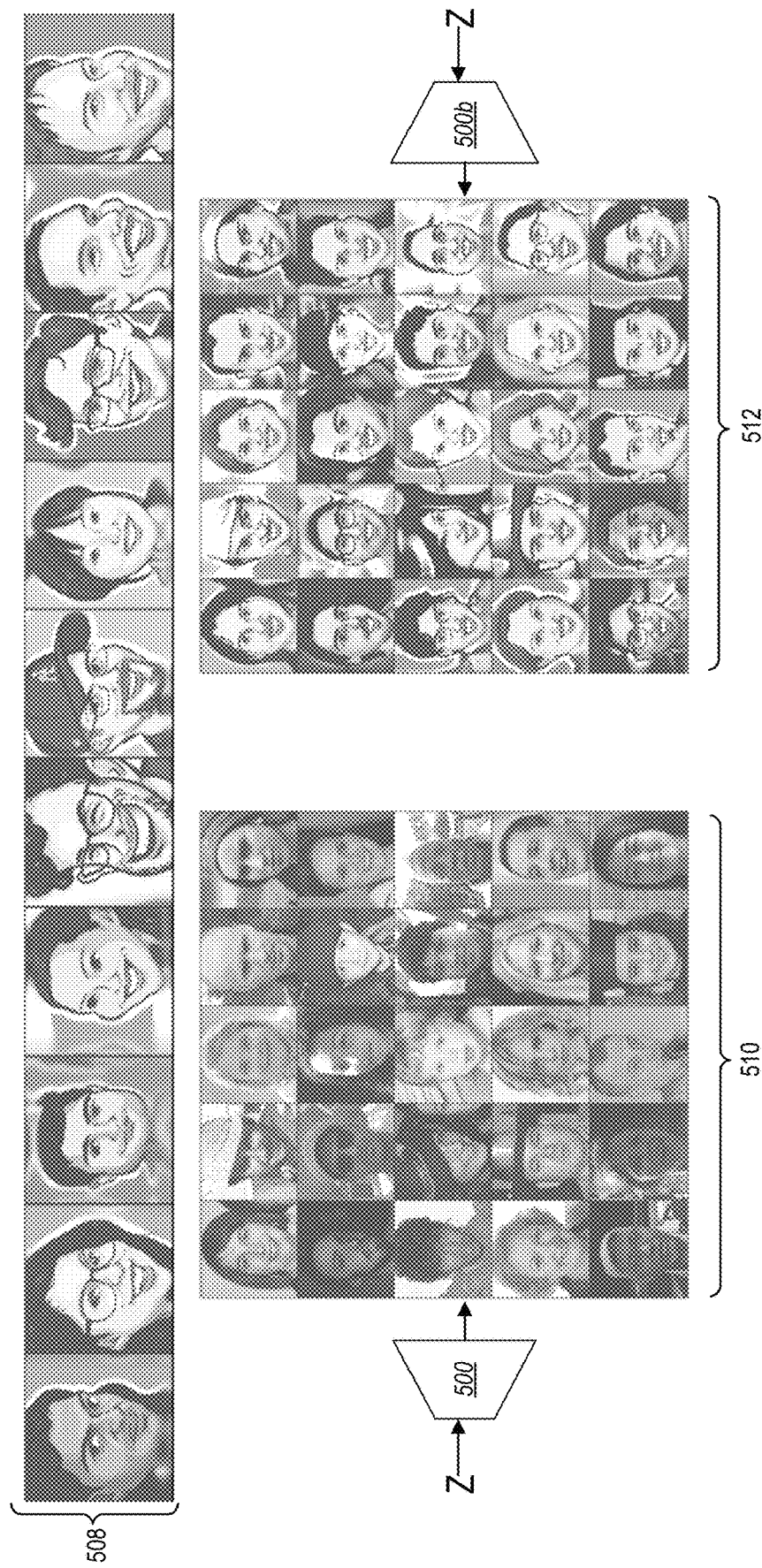

As mentioned above, in one or more embodiments, the GAN translation system ensures cross-domain correspondences between digital images belonging to a source domain and digital images belonging to a target domain. Indeed, in some cases, the GAN translation system provides a one-to-one relationship, where a given source digital image maps directly to a given target digital image when utilizing the same noise vector as input to a source generative adversarial neural network and a target generative adversarial neural network modified via the few-shot adaptation described herein. FIGS. 5A and 5B illustrate a set of digital images in a source domain generated utilizing a source GAN and a corresponding set of digital images in a target domain generated utilizing a target GAN.

As illustrated in FIG. 5A, the GAN translation system 102 generates the set of source digital images 504 utilizing a source generative adversarial neural network 500 with parameters learned from a source domain (e.g., a source domain of face portrait images). In addition, the GAN translation system 102 adapts or modifies the parameters of the source generative adversarial neural network 500 to the few-shot digital images 502 in the target domain using the few-shot adaptation process described above to generate a target generative adversarial neural network 500a. After learning the parameters of the target generative adversarial neural network 500a, the GAN translation system 102 generates the set of target digital images 506 in the target domain. As shown, the set of target digital images 506 have a certain visual style like paintings by a particular painter (e.g., Amadeo Modigliani) to match the few-shot example digital images 502, which include images of actual paintings by the artist. Furthermore, as shown, when given the same noise vector, the source generative adversarial neural network 500 and the target generative adversarial neural network 500a will generate corresponding images in the source and target domains.

In this manner if a user desires to view a particular image in a target domain, the GAN translation system 102 can encode the image into the latent space. The GAN translation system 102 can then utilize the target generative adversarial neural network 500a to generate a corresponding image in the target domain from the encoded image. Thus, as shown by FIG. 5A the GAN translation system 102 is able to allow for the generation of a portrait in the style of Modigliani from any image.

Similarly, the GAN translation system 102 can generate multiple target generative adversarial neural networks based on different target domains. In this manner, the GAN translation system 102 allows for generation of a corresponding image in different target domains, thereby allowing one to see how a face or other image appears in various domains (e.g., the same face as a cartoon or painted by a famous artist). As illustrated in FIG. 5B, the GAN translation system 102 generates digital images having a different visual style than those of FIG. 5A. Indeed, the GAN translation system 102 adapts or modifies the parameters of the source generative adversarial neural network 500 to the few-shot example digital images 508 in a second target domain using the few-shot adaptation process described above to generate a target generative adversarial neural network 500b. After learning the parameters of the target generative adversarial neural network 500b, the GAN translation system 102 generates the set of target digital images 512. As shown, the set of target digital images 512 have a caricature visual style to match the style of the few-shot example digital images 508. Furthermore, as shown, when given the same noise vector, the source generative adversarial neural network 500 and the target generative adversarial neural networks 500a, 500b will generate corresponding images in the source domain and the different target domains.

Figure 6:
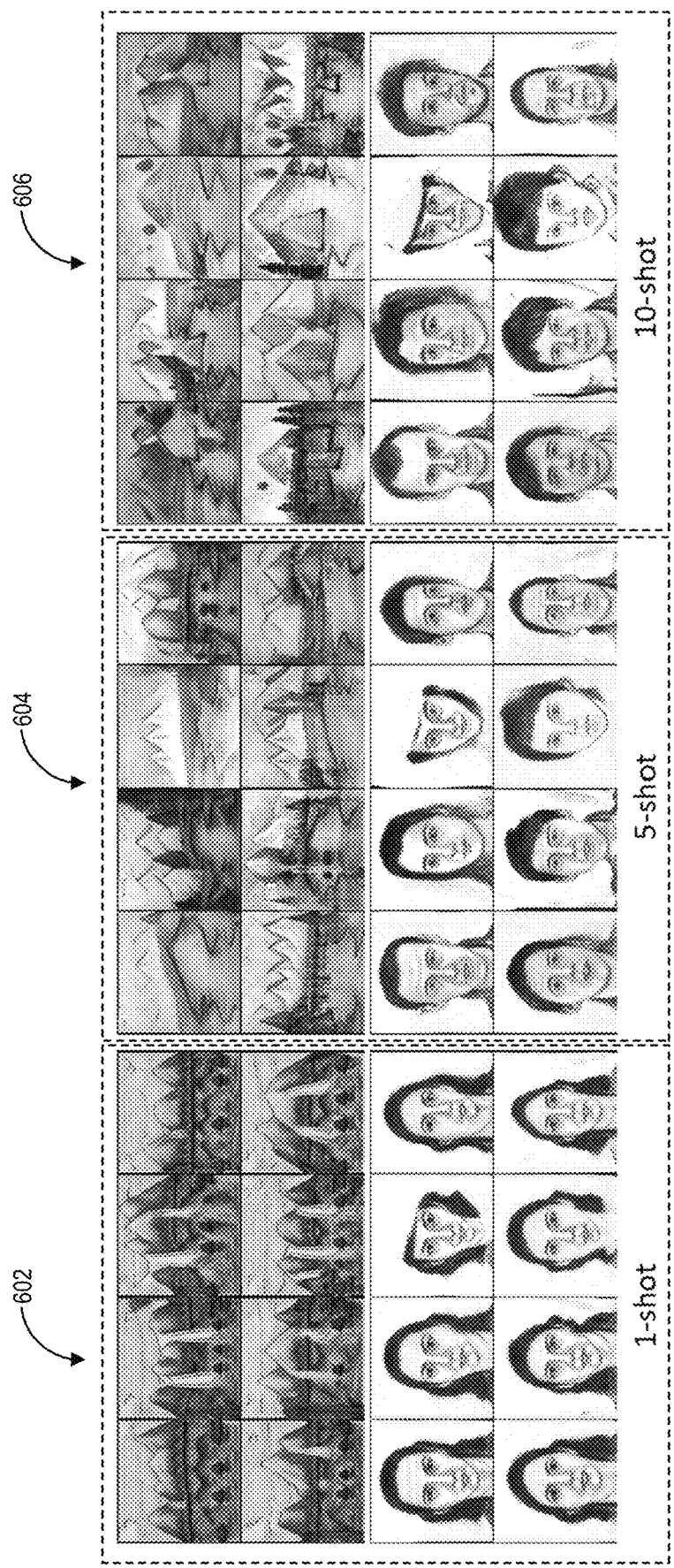
FIG. 6 illustrates example digital images generated utilizing target generative adversarial neural networks generated utilizing GAN translation with different numbers of example samples in accordance with one or more implementations.

In addition to generating faces to resemble painting styles or caricatures, embodiments of the GAN translation system 102 generate digital images in different domains as well (e.g., baby faces, older faces, male or female faces, buildings, landscapes, or cars). Additionally, the GAN translation system 102 generates digital images using a target generative adversarial neural network adapted to very few samples, sometimes as few as one, five, or ten digital images. FIG. 6 illustrates digital images generated by target GANs generated by the GAN translation system 102 generates using few-shot adaptation over different numbers of samples in accordance with one or more embodiments.

As illustrated in FIG. 6, target GANs, generated by the GAN translation system 102 based on different numbers of training examples, generate a first set of digital images 602, a second set of digital images 604, and a third set of digital images 606. In particular, the GAN translation system 102 adapt GANs from a domain comprising images of churches to landscapes (top set of digital images) and from portrait images to sketches (the bottom set of digital images). For the first set of digital images 602, the GAN translation system 102 adapts a generative adversarial neural network to a target domain utilizing only a single example digital image (e.g., a single landscape drawing or a single sketched face drawing). Even with just a single sample image, the GAN translation system 102 generates different modified digital images, such as different landscape drawings or different face sketches, preserving at least some measure diversity from a source domain.

As further illustrated in FIG. 6, the diversity in the generated digital images increase in diversity and realism with an increase in target domain samples. With a 5-shot example set, for example, the GAN translation system 102 generates the second set of modified digital images 604 with more diversity than the first set of modified digital images 602. Further, the GAN translation system 102 generates the third set of modified digital images 606 with even more diversity by modifying a generative adversarial neural network using 10-shot adaptation.

As mentioned above, target GANs generated by the GAN translation system 102 outperform many conventional digital image generation systems. Indeed, researchers have demonstrated the improved accuracy of target GANs generated by the GAN translation system 102 in generating modified digital images. FIG. 7 illustrates a table 700 of performance metrics associated with different baseline digital image generation systems as compared to the GAN translation system 102 in accordance with one or more embodiments.

For the baselines, the researchers adapted a pretrained source model to a target domain with limited data. In particular, (i) Transferring GANs (TGAN) as described by Wang et al. in *Transferring gans: generating images from limited data*, In Eur. Conf. Comput. Vis., 2018: fine tunes a pre-trained source model to a target domain with the same objective used to train the source model; (ii) Batch Statistics Adaptation (BSA) as described by Noguchi et al. in *Image generation from small datasets via batch statistics adaptation*, In Int. Conf. Comput. Vis., 2019: adapts the scale and shift parameters of the model's intermediate layers; (iii) MineGAN as described by Wang et al. in *Minegan: effective knowledge transfer from gans to target domains with few images*, In IEEE Conf. Comput. Vis. Pattern Recog., 2020: mines relevant regions in the latent space of a pre-trained model, which are better suited for adaptation to a target domain; (iv) Freeze-D as described by Mo et al., in *Freeze discriminator: A simple baseline for fine-tuning gans*, arXiv preprint arXiv:2002.10964, 2020: freezes the high resolution discriminator layers during adaptation; (v) Nonleaking data augmentations as described by Zhao et al. in *Differentiable augmentation for data-efficient gan training*, arXiv preprint arXiv:2006.10738, 2020: uses adaptive data augmentations (TGAN+ADA) in a way that does not leak into the generated results; (vi) EWC as described by Li et al., in Few-shot image generation with elastic weight consolidation, In Advances in Neural Information Processing Systems, 2020: Extends the idea of Elastic Weight Consolidation for adapting a source model to the target domain, by penalizing large changes to important parameters (estimated using Fisher information) in the pre-trained model.

As illustrated in FIG. 7, the table 700 illustrates learned perceptual image patch similarity ("LPIPS") metrics for the GAN translation system 102 alongside several conventional systems across three different domains (e.g., "Caricatures," "Amadeo's paintings," and "Sketches"). For the experiment, researchers treated k training images as k centers and generated 1000*a* digital images, assigning of one to a cluster with the lowest LPIPS distance. Once the clusters are formed, researchers computed the pairwise LPIPS distance between the members of the same cluster to determine the distance averaged over k clusters. Intuitively, a method which overfits and generates more similar digital images will have lower LPIPS distances. Thus, higher LPIPS scores generally indicate more accurate, more diverse results. As shown, the GAN translation system 102 exhibits larger distances than any of the other systems over each of the three domains.

Not only does do the target GANs generated by the GAN translation system 102 exhibit greater diversity than conventional systems, but the GAN translation system 102 further generates more accurate digital images as well. Indeed, researchers have compared digital images generated by the GAN translation system 102 as well as other systems based on common input and training images over different domains. FIG. 8 illustrates a comparison of modified digital images generated by the GAN translation system 102 and other systems in the caricature domain in accordance with one or more embodiments.

As illustrated in FIG. 8, researchers utilized several models, including NST, BSA, MineGAN, TransferGAN, and the disclosed GAN translation system 102. In particular, researchers trained each model on the same set of source digital images (e.g., face portrait images) and further modified parameters of each model based on the set of few-shot digital images 802 (e.g., caricatures). Comparing the modified digital images generated by each model, the GAN translation system 102 generates the most accurate/real set of modified digital images 812, portraying faces with the caricature style of the target domain.

On the other hand, the set of modified digital images 804 (from the NST model) includes digital images with poor quality, where the style is little changed from the original images. In addition, the set of modified digital images 806 (from the BSA model) includes digital images that are blurred out and indistinct. Further, the set of modified digital images 808 (from the MineGAN model) includes digital images that are fragmented and disjointed, sometimes hardly resembling faces at all. Further still, the set of modified digital images 810 (from the TransferGAN model) also includes fragmented, unintelligible images. The set of modified digital images 812 (from the GAN translation system 102), however, includes clear, high quality digital images that are caricature versions of source digital images.

Figure 9:
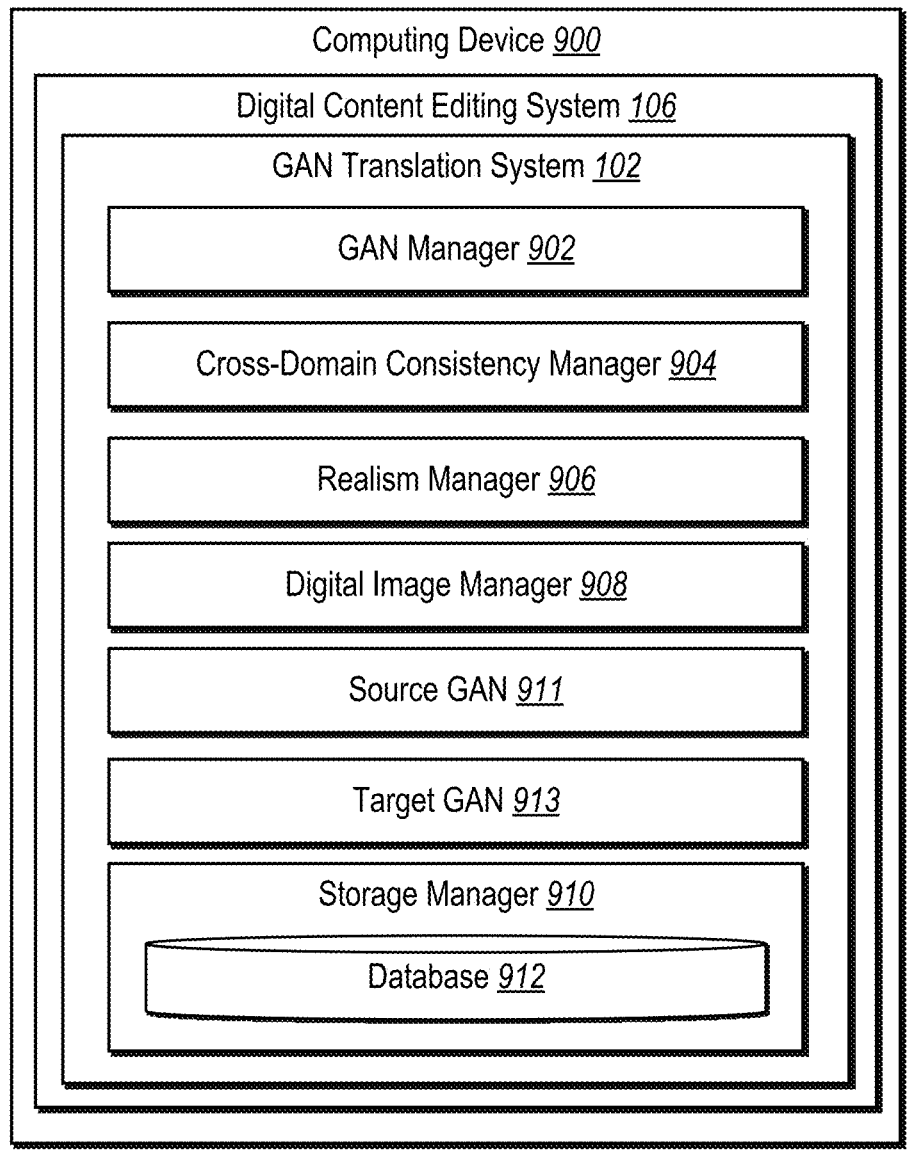
FIG. 9 illustrates a schematic diagram of a GAN translation system in accordance with one or more implementations.

Looking now to FIG. 9, additional detail will be provided regarding components and capabilities of the GAN translation system 102. Specifically, FIG. 9 illustrates an example schematic diagram of the GAN translation system 102 on an example computing device 900 (e.g., one or more of the client device 108 and/or the server(s) 104). As shown in FIG. 9, the GAN translation system 102 includes a GAN manager 902, a cross-domain consistency manager 904, a realism manager 906, a digital image manager 908, a storage manager 910 a source generative adversarial neural network or source GAN 911, and a target generative adversarial neural network or target GAN 913.

As just mentioned, the GAN translation system 102 includes a GAN manager 902. In particular, the GAN manager 902 manages, maintains, stores, trains, tunes, applies, utilizes, modifies, adapts, updates, and/or learns parameters for one or more generative adversarial neural networks. For example, the GAN manager 902 utilizes a source generative adversarial neural network 911 to generate digital images belonging to a source domain. In addition, the GAN manager 902 initializes the target GAN 913 with the parameters of the source GAN 911 and then updates or modifies the parameters to learn the target GAN 913 to generate digital images belonging to a target domain.

As illustrated in FIG. 9, the GAN translation system 102 also includes a cross-domain consistency manager 904. In particular, the cross-domain consistency manager 904 manages, determines, preserves, enforces, encourages, determines, or identifies cross-domain distance consistency. For example, the cross-domain consistency manager 904 determines relative feature distances and/or relative pairwise distances among digital images (or digital image feature vectors). In addition, the cross-domain consistency manager 904 preserves the distances when adapting a model to a target domain by implementing a cross-domain distance consistency loss as part of parameter learning.

As further illustrated in FIG. 9, the GAN translation system 102 includes a realism manager 906. In particular, the realism manager 906 manages, determines, generates, enforces, encourages, or identifies various measures of realism associated with different portions of a feature space. For example, the realism manager 906 splits a latent space into anchor regions and non-anchor regions. Additionally, the realism manager 906 enforces complete, image-level realism on digital images generated from latent vectors sampled from the anchor regions and enforces partial, patch-level realism on digital images generated from latent vectors sampled from the non-anchor regions. In some cases, the realism manager 906 utilizes region-specific adversarial loss functions to enforce the different measures of realism.

In addition, the GAN translation system 102 includes a digital image manager 908. In particular, the digital image manager 908 manages, maintains, stores, accesses, retrieves, generates, modifies, or changes one or more digital images utilizing the source GAN 911 and/or the target GAN 913.

The GAN translation system 102 further includes a storage manager 910. The storage manager 910 operates in conjunction with, or includes one or more memory devices such as the database 912 (e.g., the database 112) that store various data such as a repository of digital images and one or more generative adversarial neural networks. The storage manager 910 (e.g., via a non-transitory computer memory/one or more memory devices) stores and maintains data associated with learning parameters for a generative adversarial neural network for generating digital images in a target domain (e.g., within the database 912).

In one or more embodiments, each of the components of the GAN translation system 102 are in communication with one another using any suitable communication technologies. Additionally, the components of the GAN translation system 102 is in communication with one or more other devices including one or more client devices described above. It will be recognized that although the components of the GAN translation system 102 are shown to be separate in FIG. 9, any of the subcomponents may be combined into fewer components, such as into a single component, or divided into more components as may serve a particular implementation. Furthermore, although the components of FIG. 9 are described in connection with the GAN translation system 102, at least some of the components for performing operations in conjunction with the GAN translation system 102 described herein may be implemented on other devices within the environment.

The components of the GAN translation system 102 can include software, hardware, or both. For example, the components of the GAN translation system 102 can include one or more instructions stored on a computer-readable storage medium and executable by processors of one or more computing devices (e.g., the computing device 900). When executed by the one or more processors, the computer-executable instructions of the GAN translation system 102 can cause the computing device 900 to perform the methods described herein. Alternatively, the components of the GAN translation system 102 can comprise hardware, such as a special purpose processing device to perform a certain function or group of functions. Additionally, or alternatively, the components of the GAN translation system 102 can include a combination of computer-executable instructions and hardware.

Furthermore, the components of the GAN translation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the GAN translation system 102 may be implemented as part of a stand-alone application on a personal computing device or a mobile device. Alternatively, or additionally, the components of the GAN translation system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, LIGHTROOM®, and INDESIGN®. "ADOBE," "ADOBE EXPERIENCE MANAGER," "CREATIVE CLOUD," "ADOBE STOCK," "PHOTOSHOP," "LIGHTROOM," and "INDESIGN" are either registered trademarks or trademarks of Adobe Inc. in the United States and/or other countries.

FIGS. 1-9 the corresponding text, and the examples provide a number of different systems, methods, and non-transitory computer readable media for modifying a generative adversarial neural network using few-shot adaptation to generate target digital images while maintaining diversity and realism. In addition to the foregoing, embodiments can also be described in terms of flowcharts comprising acts for accomplishing a particular result. For example, FIGS. 10A-10B illustrate flowcharts of example sequences or series of acts in accordance with one or more embodiments.

While FIGS. 10A-10B illustrates acts according to one embodiment, alternative embodiments may omit, add to, reorder, and/or modify any of the acts shown in FIGS. 10A-10B. The acts of FIGS. 10A-10B can be performed as part of a method. Alternatively, a non-transitory computer readable medium can comprise instructions, that when executed by one or more processors, cause a computing device to perform the acts of FIGS. 10A-10B. In still further embodiments, a system can perform the acts of FIGS. 10A-10B. Additionally, the acts described herein may be repeated or performed in parallel with one another or in parallel with different instances of the same or other similar acts.

FIG. 10A illustrates an example series of acts 1000a of generating a target generative adversarial neural network from a source generative adversarial neural network utilizing example digital images from a target domain while maintaining diversity and realism. In particular, the series of acts 1000a includes an act 1002 of generating a set of digital images belonging to a source domain. For example, the act 1002 involves generating a set of digital images belonging to a source domain utilizing a first generative adversarial neural network comprising parameters learned from the source domain. In some cases, the act 1002 involves sampling a batch of noise vectors and utilizing the first generative adversarial neural network to generate the set of digital images belonging to the source domain from the batch of noise vectors.

In addition, the series of acts 1000*a* includes an act 1004 of determining relative pairwise distances among pairs of digital images. In particular, the act 1004 involves determining relative pairwise distances in a feature space among pairs of digital images from the set of digital images belonging to the source domain. For example, the act 1004 involves determining distances within a feature space between digital image feature vectors corresponding to digital images belonging to the source domain. In some cases, the act 1004 involves determining, for the generative adversarial neural network comprising parameters learned from the set of digital images belonging to the source domain, relative feature distances within a feature space between features extracted from the set of digital images.

In certain embodiments, the act 1004 involves generating digital image feature vectors representing digital images belonging to the source domain, determining a first distance between vectors of a first pair of the digital image feature vectors, and determining a second distance between vectors of a second pair of the digital images feature vectors. In these or other embodiments, the act 1004 involves determining pairwise similarities associated with a batch of noise vectors and generating, from the pairwise similarities associated with the batch of noise vectors, probability distributions for the set of digital images belonging to the source domain.

Further, the series of acts 1000*a* includes an act 1006 of learning parameters for a generative adversarial neural network while preserving the relative pairwise distances. In particular, the act 1006 involves learning parameters for a second generative adversarial neural network by updating the parameters from the first generative adversarial neural network while forcing the second generative adversarial neural network to preserve the relative pairwise distances in generating digital images in a target domain. For example, the act 1006 involves determining a relative order of similarity among the pairs of digital images from the set of digital images belonging to the source domain and enforcing the relative order of similarity for pairs of modified digital images generated by the second generative adversarial neural network.

In one or more embodiments, the act 1006 involves utilizing a cross-domain distance consistency loss to preserve the relative feature distances for few-shot adaptation from the source domain to generate digital images belonging to a target domain. In addition, the act 1006 involves enforcing a first measure of realism for digital images generated from latent vectors sampled from anchor regions within a latent space and a second measure of realism for digital images generated from latent vectors sampled from outside the anchor regions. For example, the act 1006 involves enforcing the first measure of realism by utilizing image-level realism for digital images generated from latent vectors sampled from the anchor regions. Further, the act 1006 involves enforcing the second measure of realism by utilizing patch-level realism for digital images generated from latent vectors sampled from outside the anchor regions. In some cases, utilizing the cross-domain distance consistency loss involves determining measures of divergence between the relative feature distances.

In some embodiments, the series of acts 1000*a* includes an act of generating a digital image within a target domain utilizing the second (e.g., modified) generative adversarial neural network for few-shot adaptation. For example, generating a digital image involves utilizing the target generative adversarial neural network to modify an appearance of a digital image from the source domain to match a style of a digital image from the target domain. A target generative adversarial neural network includes parameters modified from the parameters of the generative adversarial neural network learned from the source domain.

In these or other embodiments, the series of acts 1000*a* includes an act of designating anchor regions comprising subspaces within the latent space. Indeed, the series of acts includes an act of splitting the latent space into anchor regions associated with the first measure of realism and non-anchor regions associated with the second measure of realism. Further, the series of acts 1000*a* includes an act of enforcing a first measure of realism for digital images generated from latent vectors sampled from the anchor regions and a second measure of realism for digital images generated from latent vectors sampled from outside the anchor regions. In particular, the series of acts includes enforcing the first measure of realism for digital images generated from latent vectors sampled from the anchor regions by utilizing a full-image discriminator. Similarly, the series of acts includes enforcing the second measure of realism for digital images generated from latent vectors sampled from outside the anchor regions by utilizing a patch-level discriminator.

FIG. 10B illustrates an example series of acts 1000*b* of generating a target generative adversarial neural network from a source generative adversarial neural network utilizing example digital images from a target domain while maintaining diversity and realism. In one or more implementations the series of acts 1000*b* and performed together with the series of acts 1000*a* in generating a target generative adversarial neural network.

In particular, the series of acts 1000*b* includes an act 1008 of generating a first set of digital images from a first set of latent vectors sampled from a first region of a latent space. In particular, the act 1008 involves generating, utilizing the target generative adversarial neural network, a first set of digital images from a first set of latent vectors sampled from a first region of a latent space.

In addition, the series of acts 1000*b* includes an act 1010 of generating a second set of digital images from a second set of latent vectors sampled from a second region of the latent space. In particular, the act 1010 involves generating, utilizing the target generative adversarial neural network, a second set of digital images from a second set of latent vectors sampled from a second region of the latent space.

Further, the series of acts 1000*b* includes an act 1012 of updating parameters of the target generative adversarial neural network. In particular, the act 1012 involves enforcing, for the first set of digital images, a first measure of realism compared to example digital images from a target domain. Additionally, the act 1012 involves enforcing, for the second set of digital images, a second measure of realism compared to the example digital images from the target domain.

In one or more embodiments, enforcing, for the first set of digital images, the first measure of realism compared to the example digital images from the target domain comprises utilizing an image-level realism measure based-adversarial loss. In particular, utilizing the image-level realism measure comprises utilizing an adversarial loss on an entire image level in one or more embodiments. Additionally, in one or more embodiments, enforcing, for the second set of digital images, the second measure of realism compared to the example digital images from the target domain comprises utilizing a partial image-level realism measure based-adversarial loss. Furthermore, utilizing the partial image-level realism measure comprises utilizing a patch-level adversarial loss in one or more embodiments.

In one or more embodiments, the act 1012 involves splitting the latent space into the first region and the second region by defining a number of sub-regions in the latent space corresponding to a number of the example digital images from the target domain, wherein the first region comprises the sub-regions and the second region comprises a remainder of the latent space.

In some embodiments, the series of acts 1000b includes an act of determining relative feature distances within a feature space between source feature vectors generated from pairs of latent vectors generated utilizing the source generative adversarial neural network. The series of acts 1000b also involve generating the source feature vectors from the pairs of latent vectors by extracting activations from a given layer of the source generative adversarial neural network. Additionally, the series of acts 1000b includes generating target feature vectors from the pairs of latent vectors utilizing the target generative adversarial neural network. The series of acts 1000b also involve generating the target feature vectors from the pairs of latent vectors by extracting activations from the given layer of the target generative adversarial neural network. Still further, in such embodiments, the series of acts 1000b includes updating parameters of the target generative adversarial neural network by enforcing a cross-domain distance consistency between the relative feature distances and distances in the feature space between the target feature vectors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
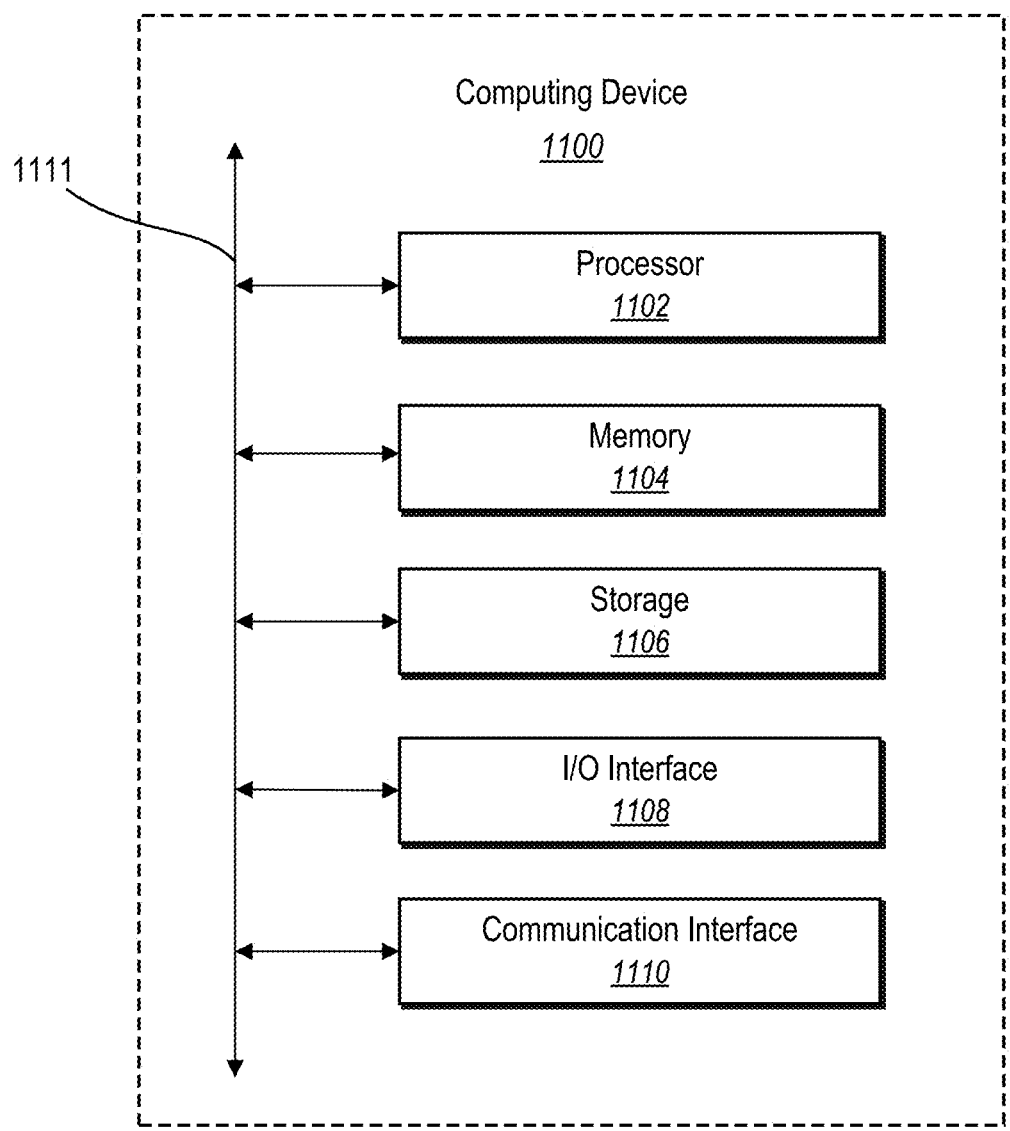
FIG. 11 illustrates a block diagram of an example computing device in accordance with one or more implementations.

FIG. 11 illustrates, in block diagram form, an example computing device 1100 (e.g., the computing device 900, the client device 108, and/or the server(s) 104) that may be configured to perform one or more of the processes described above. One will appreciate that the GAN translation system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1111. The bus 1111 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   generate a set of digital images belonging to a source domain utilizing a first generative adversarial neural network comprising parameters learned from the source domain;
   determine relative pairwise distances in a feature space among pairs of digital images from the set of digital images belonging to the source domain; and
   learn parameters for a second generative adversarial neural network by updating the parameters from the first generative adversarial neural network while forcing the second generative adversarial neural network to preserve the relative pairwise distances in generating digital images in a target domain.

2. The non-transitory computer readable medium of claim 1, further comprising instructions that, when executed by the at least one processor, cause the computing device to generate a digital image within a target domain utilizing the second generative adversarial neural network.

3. The non-transitory computer readable medium of claim 1, further comprising instructions that, when executed by the at least one processor, cause the computing device to generate the set of digital images belonging to the source domain by:
   sampling a batch of noise vectors; and
   utilizing the first generative adversarial neural network to generate the set of digital images belonging to the source domain from the batch of noise vectors.

4. The non-transitory computer readable medium of claim 1, further comprising instructions that, when executed by the at least one processor, cause the computing device to determine the relative pairwise distances by determining distances within a feature space between digital image feature vectors corresponding to digital images belonging to the source domain.

5. The non-transitory computer readable medium of claim 1, further comprising instructions that, when executed by the at least one processor, cause the computing device to force the second generative adversarial neural network to preserve the relative pairwise distances by:
   determining a relative order of similarity among the pairs of digital images from the set of digital images belonging to the source domain; and
   enforcing the relative order of similarity for pairs of digital images generated by the second generative adversarial neural network.

6. The non-transitory computer readable medium of claim 1, further comprising instructions that, when executed by the at least one processor, cause the computing device to designate anchor regions comprising subspaces within a latent space.

7. The non-transitory computer readable medium of claim 6, further comprising instructions that, when executed by the at least one processor, cause the computing device to enforce a first measure of realism for digital images generated from latent vectors sampled from the anchor regions and a second measure of realism for digital images generated from latent vectors sampled from outside the anchor regions.

8. The non-transitory computer readable medium of claim 7, further comprising instructions that, when executed by the at least one processor, cause the computing device to:
   enforce the first measure of realism for digital images generated from latent vectors sampled from the anchor regions by utilizing a full-image discriminator; and
   enforce the second measure of realism for digital images generated from latent vectors sampled from outside the anchor regions by utilizing a patch-level discriminator.

9. A system comprising:
   one or more memory devices storing a source generative adversarial neural network comprising parameters learned from a set of digital images belonging to a source domain;
   one or more processors configured to cause the system to generate a target generative adversarial neural network from the source generative adversarial neural network utilizing example digital images from a target domain by:
      generating, utilizing the target generative adversarial neural network, a first set of digital images from a first set of latent vectors sampled from an anchor region comprising a region of a latent space for enforcing image-level realism;
      generating, utilizing the target generative adversarial neural network, a second set of digital images from a second set of latent vectors sampled from a non-anchor region comprising a region of the latent space for enforcing patch-level realism; and
      updating parameters of the target generative adversarial neural network by:
         enforcing, for the first set of digital images of the anchor region, a measure of image-level realism compared to the example digital images from the target domain; and
         enforcing, for the second set of digital images of the non-anchor region, a measure of patch-level realism compared to the example digital images from the target domain.

10. The system of claim 9, wherein the one or more processors are further configured to cause the system to perform operations comprising splitting the latent space into the anchor region and the non-anchor region by defining a number of sub-regions in the latent space corresponding to a number of the example digital images from the target domain, wherein the anchor region comprises the sub-regions and the non-anchor region comprises a remainder of the latent space.

11. The system of claim 9, wherein:
enforcing the measure of image-level realism for the first set of digital images comprises utilizing an image-level realism measure; and
enforcing the measure of patch-level realism for the second set of digital images comprises utilizing a partial image-level realism measure.

12. The system of claim 11, wherein:
utilizing the image-level realism measure comprises utilizing an adversarial loss on an entire image level; and
utilizing the partial image-level realism measure comprises utilizing a patch-level adversarial loss.

13. The system of claim 9, wherein the one or more processors are further configured to cause the system to perform operations comprising:
   determining relative feature distances within a feature space between source feature vectors generated from pairs of latent vectors generated utilizing the source generative adversarial neural network;
   generating target feature vectors from the pairs of latent vectors utilizing the target generative adversarial neural network; and
   updating parameters of the target generative adversarial neural network by enforcing a cross-domain distance consistency between the relative feature distances and distances in the feature space between the target feature vectors.

14. The system of claim 13, wherein the one or more processors are further configured to cause the system to perform operations comprising:
   determining pairwise similarities associated with a batch of noise vectors; and
   generating, from the pairwise similarities associated with the batch of noise vectors, probability distributions for the set of digital images belonging to the source domain.

15. The system of claim 13, wherein the one or more processors are further configured to cause the system to perform operations comprising:
- generating the source feature vectors from the pairs of latent vectors by extracting activations from a given layer of the source generative adversarial neural network; and
- generating the target feature vectors from the pairs of latent vectors by extracting activations from the given layer of the target generative adversarial neural network.

16. A computer-implemented method for preserving diversity and realism in target digital images utilizing few-shot adaptation for generative adversarial neural networks, the computer-implemented method comprising:
- generating a set of digital images belonging to a source domain utilizing a first generative adversarial neural network comprising parameters learned from the source domain;
- determining relative pairwise distances in a feature space among pairs of digital images from the set of digital images belonging to the source domain; and
- learning parameters for a second generative adversarial neural network by updating the parameters from the first generative adversarial neural network while forcing the second generative adversarial neural network to preserve the relative pairwise distances in generating digital images in a target domain.

17. The computer-implemented method of claim 16, further comprising generating a digital image within a target domain utilizing the second generative adversarial neural network.

18. The computer-implemented method of claim 16, further comprising generating the set of digital images belonging to the source domain by:
- sampling a batch of noise vectors; and
- utilizing the first generative adversarial neural network to generate the set of digital images belonging to the source domain from the batch of noise vectors.

19. The computer-implemented method of claim 16, wherein determining the relative pairwise distances comprises determining distances within a feature space between digital image feature vectors corresponding to digital images belonging to the source domain.

20. The computer-implemented method of claim 16, further comprising designating anchor regions comprising subspaces within a latent space.

* * * * *